United States Patent
Stach et al.

(10) Patent No.: US 11,410,261 B2
(45) Date of Patent: *Aug. 9, 2022

(54) DIFFERENTIAL MODULATION FOR ROBUST SIGNALING AND SYNCHRONIZATION

(71) Applicant: Digimarc Corporation, Beaverton, OR (US)

(72) Inventors: John F. Stach, Portland, OR (US); Ajith M. Kamath, Beaverton, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 17/020,307

(22) Filed: Sep. 14, 2020

(65) Prior Publication Data

US 2021/0073935 A1    Mar. 11, 2021

Related U.S. Application Data

(63) Continuation of application No. 16/247,259, filed on Jan. 14, 2019, now Pat. No. 10,776,894, which is a
(Continued)

(51) Int. Cl.
*G06K 9/00* (2022.01)
*G06T 1/00* (2006.01)

(52) U.S. Cl.
CPC ............ *G06T 1/005* (2013.01); *G06T 1/0028* (2013.01); *G06T 1/0064* (2013.01);
(Continued)

(58) Field of Classification Search
CPC ............... G06T 1/0028; G06T 1/005; G06T 2201/0061; G06T 2201/0065; G06T 2201/0202
See application file for complete search history.

(56) References Cited

U.S. PATENT DOCUMENTS 5,450,490 A   9/1995   Jensen
5,768,426 A   6/1998   Rhoads
(Continued)

FOREIGN PATENT DOCUMENTS

EP    0779741 A2    6/1997
JP    2000350001    12/2000
(Continued)

OTHER PUBLICATIONS

W Bender, D Gruhl, N Morimoto, A Lu, Techniques for data hiding, IBM Systems Journal, vol. 35, Nos. 3&4, 313-336 1996.
(Continued)

*Primary Examiner* — Atiba O Fitzpatrick
(74) *Attorney, Agent, or Firm* — Digimarc Corporation

(57) ABSTRACT

Differential modulation schemes encode a data channel within host signal or noisy environment in a manner that is robust, flexible to achieve perceptual quality constraints, and provides improved data capacity. Differential arrangements enable a decoder to suppress host signal or other background signal interference when detecting, synchronizing and extracting an encoded data channel. They also enable the incorporation of implicit or explicit synchronization components, which are either formed from the data signal or are complementary to it.

12 Claims, 16 Drawing Sheets

| a  | b  | -a | -b | c  | d  | -c | -d |
|----|----|----|----|----|----|----|----|
| -d | -a | -b | -a | -b | -c | -d | -c |
| a  | b  | -a | -b | c  | d  | -c | -d |
| -d | a  | b  | a  | b  | c  | d  | c  |
| e  | f  | -e | -f | g  | h  | -g | -h |

Related U.S. Application Data continuation of application No. 15/687,332, filed on Aug. 25, 2017, now Pat. No. 10,181,170, which is a continuation of application No. 14/724,729, filed on May 28, 2015, now Pat. No. 9,747,656.

(60) Provisional application No. 62/106,685, filed on Jan. 22, 2015.

(52) U.S. Cl.
CPC ........... *G06T 2201/0061* (2013.01); *G06T 2201/0065* (2013.01); *G06T 2201/0202* (2013.01)

(56) References Cited

U.S. PATENT DOCUMENTS

| | | | |
|---|---|---|---|
| 5,774,452 A | 6/1998 | Wolosewicz | |
| 5,809,160 A | 9/1998 | Powell | |
| 5,862,260 A | 1/1999 | Rhoads | |
| 6,122,403 A | 9/2000 | Rhoads | |
| 6,304,966 B1 | 10/2001 | Shimizu | |
| 6,363,159 B1 | 3/2002 | Rhoads | |
| 6,442,285 B2 | 8/2002 | Rhoads | |
| 6,505,160 B1 | 1/2003 | Levy | |
| 6,614,914 B1 | 9/2003 | Rhoads | |
| 6,625,297 B1 | 9/2003 | Bradley | |
| 6,674,876 B1 | 1/2004 | Hannigan | |
| 7,003,132 B2 | 2/2006 | Rhoads | |
| 7,003,731 B1 | 2/2006 | Rhoads | |
| 7,006,555 B1 | 2/2006 | Srinivasan | |
| 7,054,465 B2 | 5/2006 | Rhoads | |
| 7,065,226 B1 | 6/2006 | Anzai | |
| 7,072,490 B2 | 7/2006 | Stach | |
| 7,076,082 B2 | 7/2006 | Sharma | |
| 7,113,615 B2 | 9/2006 | Rhoads | |
| 7,352,878 B2 | 4/2008 | Reed | |
| 7,412,072 B2 | 8/2008 | Sharma | |
| 7,587,602 B2 | 9/2009 | Rhoads | |
| 7,643,649 B2 | 1/2010 | Davis | |
| 7,773,770 B2 | 8/2010 | Evans | |
| 7,965,863 B2 | 6/2011 | Jones | |
| 7,986,807 B2 | 7/2011 | Stach | |
| 8,107,674 B2 | 1/2012 | Davis | |
| 8,355,514 B2 | 1/2013 | Rhoads | |
| 8,477,990 B2 | 7/2013 | Reed | |
| 8,687,839 B2 | 4/2014 | Sharma | |
| 8,791,789 B2 | 7/2014 | Petrovic | |
| 8,873,797 B2 | 10/2014 | Reed | |
| 9,380,186 B2 | 6/2016 | Reed | |
| 9,401,001 B2 | 7/2016 | Reed | |
| 9,449,357 B1 | 9/2016 | Lyons | |
| 2004/0133427 A1 | 7/2004 | Alattar | |
| 2005/0002543 A1 | 1/2005 | Cornog | |
| 2005/0025337 A1* | 2/2005 | Lu | G06T 1/0028 382/100 |
| 2006/0165311 A1 | 7/2006 | Watson | |
| 2009/0208131 A1* | 8/2009 | Nguyen | G06T 1/0057 382/276 |
| 2009/0259325 A1 | 10/2009 | Topchy | |
| 2009/0285442 A1 | 11/2009 | Magai | |
| 2010/0150434 A1 | 6/2010 | Reed | |
| 2011/0007936 A1 | 1/2011 | Rhoads | |
| 2011/0123063 A1 | 5/2011 | Delp | |
| 2011/0261257 A1 | 10/2011 | Terry | |
| 2012/0078989 A1 | 3/2012 | Sharma | |
| 2012/0281871 A1 | 11/2012 | Reed | |
| 2014/0142958 A1 | 5/2014 | Sharma | |
| 2016/0321473 A1 | 11/2016 | Decoux | |

FOREIGN PATENT DOCUMENTS

| | | |
|---|---|---|
| JP | 2006295473 A | 10/2006 |
| JP | 2006295474 A | 10/2006 |
| WO | 0106703 A1 | 1/2001 |
| WO | 2007040112 | 4/2007 |

OTHER PUBLICATIONS

International Search Report and Written Opinion dated Mar. 31, 2016 in PCT/US16/14447. (10 pages).

International Search Report and Written Opinion in PCT/US13/65069 dated Apr. 23, 2014.

Kutter, 'Watermarking Resisting to Translation, Rotation and Scaling,' Proc. of SPIE: Multimedia Systems and Applications, vol. 3528, pp. 423-431, Boston, Nov. 1998.

Fleet et al., 'Embedding Invisible Information in Color Images,' Proc. Int. Conf. on Image Processing, vol. 1, pp. 532-535, Oct. 1997.

Willis, et al. "InfraStructs: Fabricating Information Inside Physical Objects for Imaging in the Terahertz Region," ACM Trans. Graph. 32, 4, Article 138 (Jul. 2013), 10 pages.

U.S. Appl. No. 62/106,685, filed Jan. 22, 2015. (83 pages).

Google Machine Translation (Japanese to English) of JP2006295473. (24 pages).

Google Machine Translation (Japanese to English) of JP2006295474. (21 pages).

Japanese Office Action for Application No. JP2017-537935, dated Oct. 8, 2019, 7 pages.

European search report for EP Application 16740811.1 corresponding to PCT/US2016014447 (10 pages).

Gerald C Langelaar et al.: "A State of the Art Overview", IEEE Signal Processing Magazine, IEEE Service Center, Piscataway, NJ, US, vol. 17, No. 5, Sep. 1, pp. 20-46, XP011089874, ISSN: 1053-5888.

English translation of Japanese Office Action for Application No. JP2017-537935, dated Oct. 8, 2019, 7 pages.

Japanese Office Action (with English language translation) for App No. JP2017-537935, dated Apr. 14, 2020, 14 pages, including English translation of currently pending claims.

European Office Action dated Nov. 5, 2020 for European Application No. 16740811.1.

\* cited by examiner

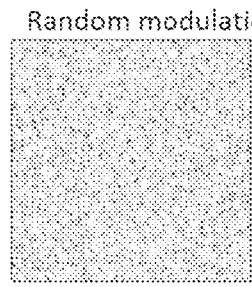
Fig. 8
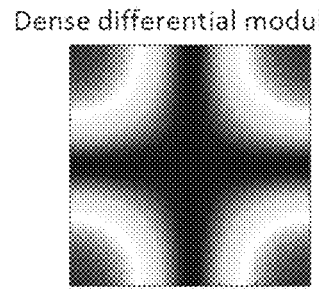
Fig. 9
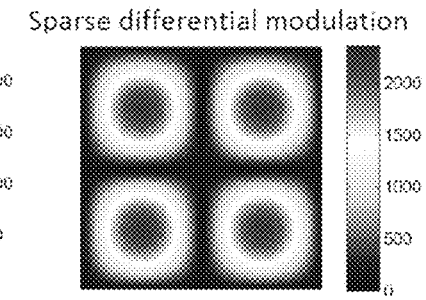
Fig. 10
| a  |    | -a |    |
|----|----|----|----|
|    | -a |    | -a |
| a  |    | -a |    |
|    | a  |    | a  |
Fig. 11
| a  | b  | -a | -b | c  | d  | -c | -d |
|----|----|----|----|----|----|----|----|
| -d | -a | -b | -a | -b | -c | -d | -c |
| a  | b  | -a | -b | c  | d  | -c | -d |
| -d | a  | b  | a  | b  | c  | d  | c  |
| e  | f  | -e | -f | g  | h  | -g | -h |
Fig. 12

DIFFERENTIAL MODULATION FOR ROBUST SIGNALING AND SYNCHRONIZATION

RELATED APPLICATION DATA

This application is a continuation of U.S. application Ser. No. 16/247,459, filed Jan. 14, 2019 (now U.S. Pat. No. 10,776,894) which is a continuation of U.S. application Ser. No. 15/687,332, filed Aug. 25, 2017 (now U.S. Pat. No. 10,181,170) which is a continuation of U.S. application Ser. No. 14/724,729, filed May 28, 2015 (now U.S. Pat. No. 9,747,656) which claims benefit of U.S. Application No. 62/106,685, filed Jan. 22, 2015. The Ser. No. 62/106,685 application is hereby incorporated herein by reference in its entirety.

TECHNICAL FIELD

The invention relates to signal communication in noisy environments, and in particular to robust signal communication within host media signals, such as digital watermarking.

BACKGROUND AND SUMMARY

Though the field of signal communication through host media signals, such as image and audio signals, is well developed, challenges persist in providing reliable communication, with sufficient data capacity, while not impairing perceptual quality of the host signal. Within this field, an approach for signal communication in host signals is often referred to as "digital watermarking." Digital watermarking most often refers to a form of signaling in which a data channel is embedded within a host or cover signal while minimizing the impact of the embedding on perceptual quality of the host, e.g., when that host signal is perceived by humans. Relatedly, steganographic encoding refers to methods of communicating data in a cover signal (including ambient background signals) so that the data is hidden from ordinary human observation. Steganographic decoding is the complementary process of recovering the hidden data from a received signal.

The boundaries of digital watermarking blur as this type of signaling overlaps with other signaling techniques with similar attributes or application objectives. Various techniques and applications exist for signaling in host signals like still images, video, and audio. For many applications, the data channel is embedded and extracted digitally, yet must survive conversion to and from the analog domain as well as distortion. Popular examples include encoding digital data in images applied to physical objects, or transmitting digital data in sound signals transmitted from speakers to mobile devices in noisy venues. The data signal encounters distortion at every step along its path, from the conversion into rendered form, the mixing with other signals and background noise, and the capture of the signal within a sensor of the receiver. In some communication channels, there may be negligible host signal content, such as when signaling within regions devoid of image content on a package or document, or signaling through an audio like data channel at frequency ranges at or near the limits of human hearing (e.g., around 20 Hz). In other cases, data carrying symbols like one dimensional (1D) or two dimensional (2D) bar codes, which are not intended to be embedded within host content, are nonetheless modified to convey graphical designs as well as machine readable data elements.

Additionally, conventional 2D code matrices are made less visually obtrusive by printing them with less visible inks or varnish layers and detecting the codes with illumination, sensors and signal processing tailored to amplify the data signal. As another example, 2D codes may be adapted to be less visible by printing at higher resolution and repeated on an object. Colors and higher dimensional multi-spectral bands, just within or just beyond the limits of the human visual system, may also be leveraged as additional hosts for auxiliary data channels to increase capacity, reliability and/or perceptual quality. Use of redundancy encoding and error correction techniques enable such bar code adaptations or glyph codes to be combined with other image content on packaging, documents, labels, and other types of objects, in a manner that is less perceptible or not interfering with the legibility of other visual content with which it is mixed. These types of approaches tend to blur the boundaries of what might be considered to be digital watermarking, extending our robust signaling methodologies to application domains with little or sparse host content within which to embed the data channel.

Nevertheless, this document is concerned with robust auxiliary data signal communication without being confined to a particular definition of digital watermarking or data signaling technique. For many applications of robust signaling, the challenge is balancing the competing objectives of maintaining reliability in the face of distortion, expanding data carrying capacity, and achieving sufficient perceptual quality. This is always a challenge because the objectives conflict. For example, increasing the data capacity impacts reliability. Increasing signal strength to improve reliability can introduce modifications to the host signal that degrade its perceptual quality and/or limit information carrying capacity.

An additional challenge of embedding a data channel in a host medium is that the host becomes a source of noise or interference with data channel. Some approaches seek to mitigate interference by employing information theoretic approaches to encode an auxiliary data channel within the host channel. For example, data coding patterns may be selected that minimize changes to the host signal. These techniques are sometimes categorized as "informed embedding," as the encoder operation is informed by specific information characteristics of the host to embed data with reduced host distortion, increased capacity, and/or increased reliability. These techniques may be employed in combination with additional methods for mitigating host signal interference.

In our prior work, we have developed schemes for mitigating host signal interference through differential encoding that is paired with complementary signal detection or decoding operations. See, for example, US Patent Publications 20140142958 (with differential encoding applied in audio channels) and 20100150434 (with differential encoding applied to signals encoded in color channels of image content), which are incorporated by reference. Differential encoding generally refers to a scheme in which data signal elements are encoded in differential relationships at locations within a host channel. These data signal elements are mapped to corresponding embedding locations within the host channel.

There are a myriad of ways to prepare the signal elements for encoding, and as such, differential encoding applies to many different data signaling strategies. To illustrate, a non-exhaustive list includes selecting code symbols, applying error correction, selecting signal features of the host to carry a signal element. U.S. Pat. No. 6,122,403 provides examples of auxiliary data signals modulated on carriers with positive and negative signal elements. 20140142958 and 20100150434 illustrate different examples of how to exploit differential encoding.

Host signal interference can be mitigated when the signal detector and data extraction processes exploit the differential arrangement to suppress the host signal. To facilitate this operation in the decoding process, differential encoding is applied to embedding locations of a host signal where the values of the host signal are correlated. The host is suppressed by decode operations on the received signal that combine the differentially encoded information constructively, while cancelling correlated host signal components, increasing the signal to noise ratio of the data signal to the host. Examples of these types of operations are provided in 20140142958 and 20100150434.

These techniques for improving the signal reliability become more difficult to implement in applications where the embedded data signal is likely to be distorted in ways that make synchronization difficult. Such distortion can crop or truncate portions of the embedded signal, or warp its structure (e.g., a geometric or temporal distortion, including projective transformations). The application requirement, for example, may dictate that the data signal be reliably recovered from small portions of host signals at arbitrary locations and geometric transformations (including perspective transforms). Image capture of an object or document with 2D sensor in a camera or scanner introduces geometric distortion and cropping of the signal, in addition to distortion introduced in printing, deformation and degradation of the object. Audio capture of ambient audio crops and samples the signal with temporal distortion, in addition to distortion introduced in generating the audio, compressing it, and mixing it with ambient noise and echoes. Some applications further require that portions of the host convey different data, such that a stream of the host signal provides a reliable channel for a stream of data.

This distortion dictates that the data channel be designed to be robust to it. One way to do this is to use encoding strategies that employ attributes of the host that are robust to geometric or temporal distortion, or employ a host modulation scheme that is robust to distortion. In addition, the design of the encoded signal often needs to provide signal structure that facilitates detection and synchronization. This signal structure, to the extent it occupies a portion of the channel where data could otherwise be encoded, limits data capacity. Another implication of introducing synchronization components within the signaling scheme is that these components can degrade perceptual quality, for example, by introducing un-wanted human perceptible elements. In some schemes, a synchronization signal may also interfere with the data carrying signal in the channel. There is a need for data signaling that is both robust to de-synchronization, without substantially interfering with data signal capacity.

The application of the signaling scheme tends to have unique design constraints that emphasize some combination of the above-mentioned considerations in addition to others. To illustrate, we provide a few examples, without intending to limit our scope to them. One application domain is conveying a data signal in a physical object and reading it from a signal sensed from sensors on a mobile device or other consumer electronic equipment. In the realm of conveying signals in physical objects, robustness requirements include the ability of the data to survive distortions due to digital processing, like compression, degradation encountered in applying the signal to the object (e.g., 2D and 3D printing, engraving, etching on a 2D or even 3D curved or irregular surface) and in sensing the signal from the object.

Another application domain is conveying the signal in a video display or audio speaker output and reading it from a signal sensed from sensors on a mobile device or other consumer electronics. Image and audio like signaling present challenges unique to these signal types. Printing technologies pose limitations due to the types of inks and colors employed, registration among printing plates, and other limits on the control of application of ink to a substrate, including the limits on print quality and resolution of print primitives to retain the data channel (line art, half-toning, screen angle, dot gain, etc.). Display technologies pose limitations in terms of screen resolution, color format, screen format (including aspect ratio, key-stoning, etc.), refresh rate, etc. The target host signal content poses limitations as well. For image based signaling, the nature of the imagery or artwork, or absence thereof, limits the available data encoding channel. Document content differs from package or label content. Video formats and codecs, and video content quality and data rate vary as well. Audio signaling, particular in noisy environments, present other challenges, with different forms of noise, distortion and interference.

The design of a signaling scheme must also account for practical challenges posed by constraints on digital circuitry, processors and memory for encoding and decoding. These include computational efficiency, power consumption, memory consumption, memory bandwidth, use of network bandwidth, cost of hardware circuitry or programmable processors/circuitry, cost of designing and integrating encoders and decoders within signal transmitter and receiver, equipment, etc. For example, some encoding schemes may provide optimized encoding or decoding, but may not be applicable because they are too slow for encoding or decoding in real time, e.g., as the host signal is being transmitted, received, updated, or being processed with multiple other signal processing operations concurrently.

In this document, we detail various modulation schemes, including schemes for generating signals, and encoding and decoding them in data channels. We describe differential modulation schemes that encode a data channel within host signal or noisy environments in a manner that is robust, flexible to achieve perceptual quality constraints, and provides improved data capacity. Differential arrangements applied by the encoder enable a decoder to suppress host signal or other background signal interference when detecting, synchronizing and extracting an encoded data channel. They also enable the incorporation of implicit or explicit synchronization components, which are either formed from the data signal or are complementary to it.

One approach described in this document is a method of encoding auxiliary data in a host image signal. This method generates an auxiliary data signal comprised of variable data elements. It maps each of the variable data elements to plural blocks within the host image signal. Each block comprises neighboring embedding locations within the host image signal. For each variable data element, the method modulates the host image signal according to the variable data element to embed the variable data element in corresponding plural blocks. Within each of the corresponding plural blocks, the modulation process modulates the host image by establishing differential relationships between the variable data element in non-adjacent embedding locations within each block.

Various alternative forms of this technology are described, including apparatus, digital logic modules, and programmed processor modules.

BRIEF DESCRIPTION OF THE DRAWINGS

FIG. 4 illustrates a 4×4 arrangement of embedding locations in a sub-block of a tile.

FIG. 5 illustrates the arrangement of 4 different data signal elements, A, B, C, D, each differentially encoded within the 4×4 arrangement of bit cells of FIG. 4.

FIG. 6 illustrates an example of a sparse differential encoding arrangement.

FIG. 7 shows an example of interleaved data elements using the sparse differential encoding scheme of FIG. 6.

FIG. 8 depicts the frequency spectrum of a data signal with pseudo-random mapping to embedding locations in a tile.

FIG. 9 depicts the frequency spectrum of a data signal with dense differential mapping (e.g., from FIG. 5) to embedding locations in a tile.

FIG. 10 shows the frequency spectrum of a data signal with sparse differential mapping (e.g., from FIG. 7) to embedding locations in a tile.

FIG. 11 depicts a sparse differential pattern, similar to FIG. 6 and extending redundancy of a pattern carrying a data element, such as element "a."

FIG. 12 depicts the sparse pattern of FIG. 11, extended to show additional data signal elements mapped to embedding locations.

DETAILED DESCRIPTION

Signal Encoder and Decoder

Figure 1:
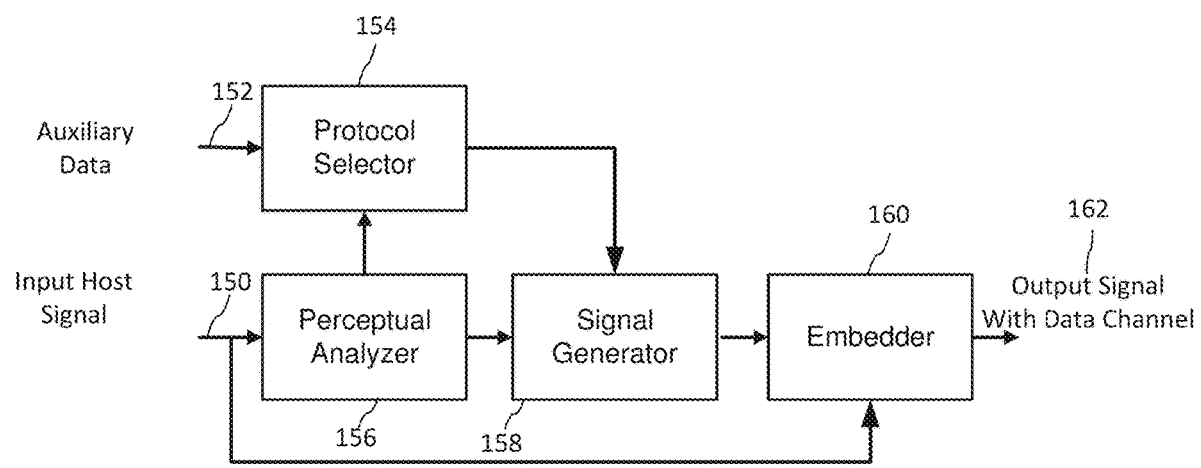
FIG. 1 is a block diagram of a signal encoder for encoding a data signal into a host signal.
Figure 2:
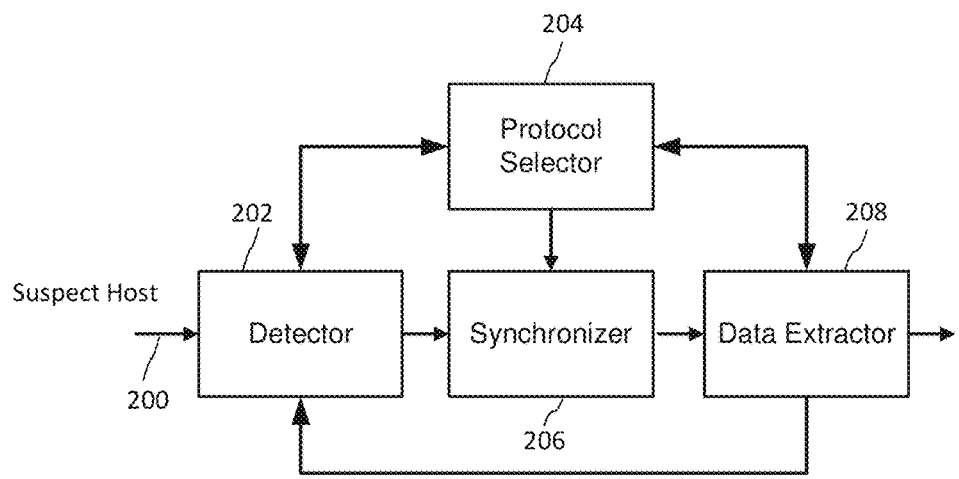
FIG. 2 is a block diagram of a signal decoder for extracting a data signal from a host signal.

FIG. 1 is a block diagram of a signal encoder for encoding a data signal into a host signal. FIG. 2 is a block diagram of a compatible signal decoder for extracting a data signal from a host signal.

While the signal encoder and decoder may be used for communicating a data channel for many applications, our particular focus has been robust signal communication in host image or audio type signals. Encoding and decoding is typically applied digitally, yet the signal is expected to survive digital to analog transformation and analog to digital transformation. For example, the encoder generates a modulated image or audio-like signal that is converted to a rendered form, such as a printed image, displayed image or video, or output of an audio transducer or speaker. Prior to decoding, a receiving device has a sensor such as a camera or microphone to capture the modulated signal, convert it to an electric signal, which is digitized and then processed by the decoder.

Inputs to the signal encoder include a host signal 150 and auxiliary data 152. The objectives of the encoder include encoding a robust signal with desired capacity per unit of host signal, while maintaining perceptual quality. In some cases, there may be very little variability or presence of a host signal, in which case, there is little host interference on the one hand, yet little host content in which to mask the presence of the data channel. Some examples include a package design that is devoid of much image variability (e.g., a single, uniform color).

The auxiliary data 152 includes the variable data information to be conveyed in the data channel, possibly along with other protocol data used to facilitate the communication.

The protocol defines the manner in which the signal is structured and encoded for robustness, perceptual quality or data capacity. For any given application, there may be a single protocol, or more than one protocol. Examples of multiple protocols include cases where there are different versions of the channel, different channel types (e.g., several digital watermark layers within a host). Different versions may employ different robustness encoding techniques or different data capacity. Protocol selector module 154 determines the protocol to be used by the encoder for generating a data signal. It may be programmed to employ a particular protocol depending on the input variables, such as user control, application specific parameters, or derivation based on analysis of the host signal.

Perceptual analyzer module 156 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 156 may be used to ascertain color content and masking capability of the host image. The output of this analysis, along with the rendering method (display or printing device) and rendered output form (e.g., ink and substrate) may be used to specify encoding channels (e.g., one or more color channels), perceptual models, and signal protocols to be used with those channels. Please see, e.g., our work on visibility and color models used in perceptual analysis in our U.S. application Ser. No. 14/616,686 (now U.S. Pat. No. 9,380,186), Ser. No. 14/588,636 (now U.S. Pat. No. 9,401,001) and Ser. No. 13/975,919 (now U.S. Pat. No. 9,449,357), Patent Application Publication 20100150434, and U.S. Pat. No. 7,352,878, which are hereby incorporated by reference.

When the host is intended to be sound (either a host digital audio signal and/or transmitting the encoded data within an ambient sound environment), the perceptual analyzer may be used to analyze the host sound and then select a protocol and perform perceptual masking depending on the host sound. For more information on such perceptual analysis for audio, please see our US Patent Application Publication 20140142958, incorporated above.

The perceptual analyzer module 156 also computes a perceptual model, as appropriate, to be used in controlling the modulation of a data signal onto a host channel as described below.

The signal generator module 158 operates on the auxiliary data and generates a data signal according to the protocol. It may also employ information derived from the host signal, such as that provided by perceptual analyzer module 156, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 160 takes the data signal and modulates it onto a channel by combining it with the host signal. The operation of combining may be an entirely digital signal processing operation, such as where the data signal modulates the host signal digitally, may be a mixed digital and analog process or may be purely an analog process (e.g., where rendered output images or audio are combined, with some signals being modulated data and others being host content).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host channel by adding a scaled data signal or multiplying by a scale factor dictated by the data signal value corresponding to the embedding location, with weights or thresholds set on the amount of the adjustment according to perceptual model, robustness model, and available dynamic range. The adjustment may also be altering by setting the modulated host signal to a particular level (e.g., quantization level) or moving it within a range or bin of allowable values that satisfy a perceptual quality or robustness constraint.

As detailed further below, the signal generator produces a data signal with data elements that are mapped to embedding locations in the data channel. These data elements are modulated onto the channel at the embedding locations. Again please see the documents incorporated herein for more information on variations for particular type of media.

The operation of combining may include one or more iterations of adjustments to optimize the modulated host for perceptual quality or robustness constraints. One approach, for example, is to modulate the host so that it satisfies a perceptual quality metric as determined by perceptual model (e.g., visibility or audibility model) for embedding locations across the signal. Another approach is to modulate the host so that it satisfies a robustness metric across the signal. Yet another is to modulate the host according to both the robustness metric and perceptual quality metric derived for each embedding location. The incorporated documents provide examples of these techniques. Below, we highlight a few examples.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. application Ser. Nos. 14/616,686, 14/588,636 and 13/975,919, Patent Application Publication 20100150434, and U.S. Pat. No. 7,352,878, already incorporated herein.

A similar approach may be used for audio signals as outlined in 20140142958.

The embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host, or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish differential relationships of the data signal within a particular tile, region in a tile or bit cell pattern of the modulated host. To do so, the embedder adjusts bit cells that violate a differential relationship so that the differential relationship is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. Nos. 14/616,686, 14/588,636 and 13/975,919 for image related processing and 20140142958 for audio related processing.

This modulated host is then output as an output signal 162, with an embedded data channel. The operation of combining also may occur in the analog realm where the data signal is transformed to a rendered form, such as a layer of ink, graphic overlay or audio signal, and then combined with a similar host signal form, including the ambient signal environment, with which it is mixed. One example is a data signal that is combined as a graphic overlay to other video content on a video display by a display driver. Another example is a data signal that is overprinted as a layer of material, engraved in, or etched onto a substrate, where it may be mixed with other signals applied to the substrate by similar or other marking methods. Yet another example is the output of a data signal as an audio signal (e.g., at the boundaries of the human auditory range, 20 Hz at the low end or 20 kHz at the high end), which is mixed with other audio either electronically in a sound card, or in the ambient environment when played and mixed with other sounds. In these cases, the embedder employs a predictive model of distortion and host signal interference, and adjusts the data signal strength so that it will be recovered more reliably. The predictive modeling can be executed by a classifier that classifies types of noise sources or classes of host signals and adapts signal strength and configuration of the data pattern to be more reliable to the classes of noise sources and host signals.

The output 162 from the embedder signal typically incurs various forms of distortion through its distribution or use. This distortion is what necessitates robust encoding and complementary decoding operations to recover the data reliably.

Turning to FIG. 2, signal decoder receives a suspect host signal 200 and operates on it with one or more processing stages to detect a data signal, synchronize it, and extract data. The detector is paired with input device in which a sensor or other form of signal receiver captures an analog form of the signal and an analog to digital converter converts it to a digital form for digital signal processing. Though aspects of the detector may be implemented as analog components, e.g., such as preprocessing filters that seek to isolate or amplify the data channel relative to noise, much of the signal decoder is implemented as digital signal processing modules.

The detector 202 is a module that detects presence of the data channel. The incoming signal is referred to as a suspect host because it may not have a data channel or may be so distorted as to render the data channel undetectable. The detector is in communication with a protocol selector 204 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 204.

The synchronizer module 206 synchronizes the incoming signal to enable data extraction. Synchronizing includes, for example, determining the distortion to the host signal and compensating for it. This process provides the location and arrangement of encoded data elements within the host signal.

The data extractor module 208 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory, such as a RAM memory.

Signal Generator

Figure 3:
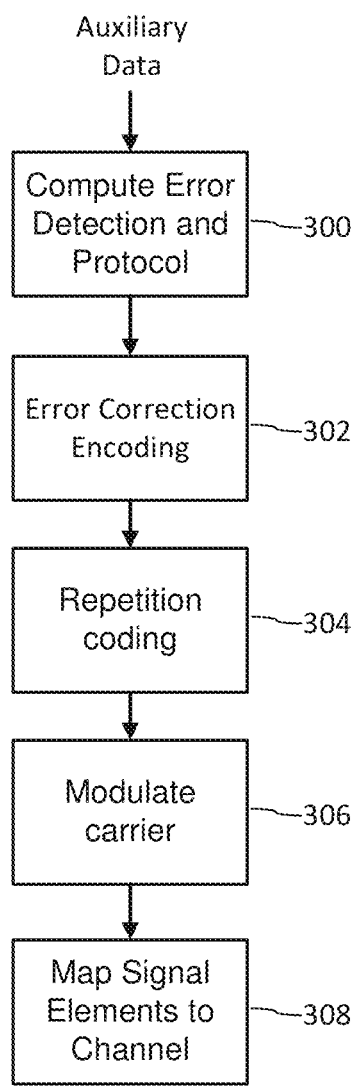
FIG. 3 is a flow diagram illustrating operations of a signal generator.

FIG. 3 is a flow diagram illustrating operations of a signal generator. Each of the blocks in the diagram depict processing modules that transform the input auxiliary data into a data signal structure. For a given protocol, each block provides one or more processing stage options selected according to the protocol. In processing module 300, the auxiliary data is processed to compute error detection bits, e.g., such as a Cyclic Redundancy Check, Parity, or like error detection message symbols. Additional fixed and variable messages used in identifying the protocol and facilitating detection, such as synchronization signals may be added at this stage or subsequent stages.

Error correction encoding module 302 transforms the message symbols into an array of encoded message elements (e.g., binary or M-ary elements) using an error correction method. Examples include block codes, convolutional codes, turbo codes, etc.

Repetition encoding module 304 repeats the string of symbols from the prior stage to improve robustness. For example, certain message symbols may be repeated at the same or different rates by mapping them to multiple locations within a unit area of the data channel (e.g., one unit area being a tile of bit cells, as described further below).

Next, carrier modulation module 306 takes message elements of the previous stage and modulates them onto corresponding carrier signals. For example, a carrier might be an array of pseudorandom signal elements, with equal number of positive and negative elements, or other waveform. We elaborate further on signal configurations below.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Various detailed examples of protocols and processing stages of these protocols are provided in our prior work, such as our U.S. Pat. Nos. 6,614,914, 5,862,260, and 6,674,876, which are hereby incorporated by reference, and US Patent Publications 20140142958 and 20100150434, previously incorporated. More background on signaling protocols, and schemes for managing compatibility among protocols, are provided in U.S. Pat. No. 7,412,072, which is hereby incorporated by reference.

The above description of signal generator module options demonstrates that the form of the signal used to convey the auxiliary data varies with the needs of the application. As introduced at the beginning of this document, signal design involves a balancing of required robustness, data capacity, and perceptual quality. We now turn to examine signal generation schemes, and in particular schemes that employ differential modulation, and schemes for facilitating detection, synchronization and data extraction of a data signal in a host channel.

One signaling approach, which is detailed in U.S. Pat. Nos. 6,614,914, and 5,862,260, is to map elements to pseudo-random locations within a channel defined by a domain of a host signal. See, e.g., FIG. 9 of U.S. Pat. No. 6,614,914. In particular, elements of a watermark signal are assigned to pseudo-random embedding locations within an arrangement of sub-blocks within a block (referred to as a "tile"). The elements of this watermark signal correspond to error correction coded bits output from an implementation of stage 304 of FIG. 3. These bits are modulated onto a pseudo-random carrier to produce watermark signal elements (block 306 of FIG. 3), which in turn, are assigned to the pseudorandom embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit. The signal decoder estimates each coded bit by accumulating evidence across the pseudo-random locations obtained after non-linear filtering a suspect host image.

This pseudo-random arrangement spreads the data signal such that it has a uniform spectrum across the tile. However, this uniform spectrum may not be the best choice from a signal communication perspective since energy of a typical host image is concentrated around DC. Similarly, an auxiliary data channel in high frequency components tends to be more disturbed by blur or other low pass filtering type distortion than other frequency components.

We now turn to design of modulation schemes that provide improved performance in terms of various important design factors. These factors include robustness, mitigation of host signal interference, improved synchronization capability, optimal data capacity and perceptual quality. In the case of robustness, for example, we consider auxiliary signal structure with a power distribution optimized for robustness to certain types of distortion (e.g., print and scan distortion for images). We illustrate examples for the case of host signals that are images or analogous to images. However, these schemes are not limited to data channels for image content.

In our description of modulation schemes for images, we illustrate signal structures with improved spectral characteristics. Based on experimental evidence, mid-range frequencies are preferred over high and low frequencies since these are more susceptible to cover image interference and blur. Results from print and scan experiments show clear advantage of these modulations schemes for digital watermarking systems built to be robust to print-and-scan distortion within low signal to noise regimes.

Dense Differential Modulation

In a dense differential modulation scheme, each auxiliary data signal element of a data signal is mapped to a closely grouped set of embedding locations. The signal element corresponds to an elementary unit of the data signal that the decoder will seek to estimate, as part of the decoding process. Leveraging the differential arrangement, the decoder obtains an estimate of this elementary unit from the differentially encoded pair of signals at these closely grouped embedding locations. This scheme seeks to exploit the anticipated correlation between values of the host signal at adjacent embedding locations. The estimate of the elementary unit is derived by, for example, summing the difference between differentially encoded pairs of data signal in the neighboring group of embedding locations of the host signal.

Figures 4, 5, 6, 7:
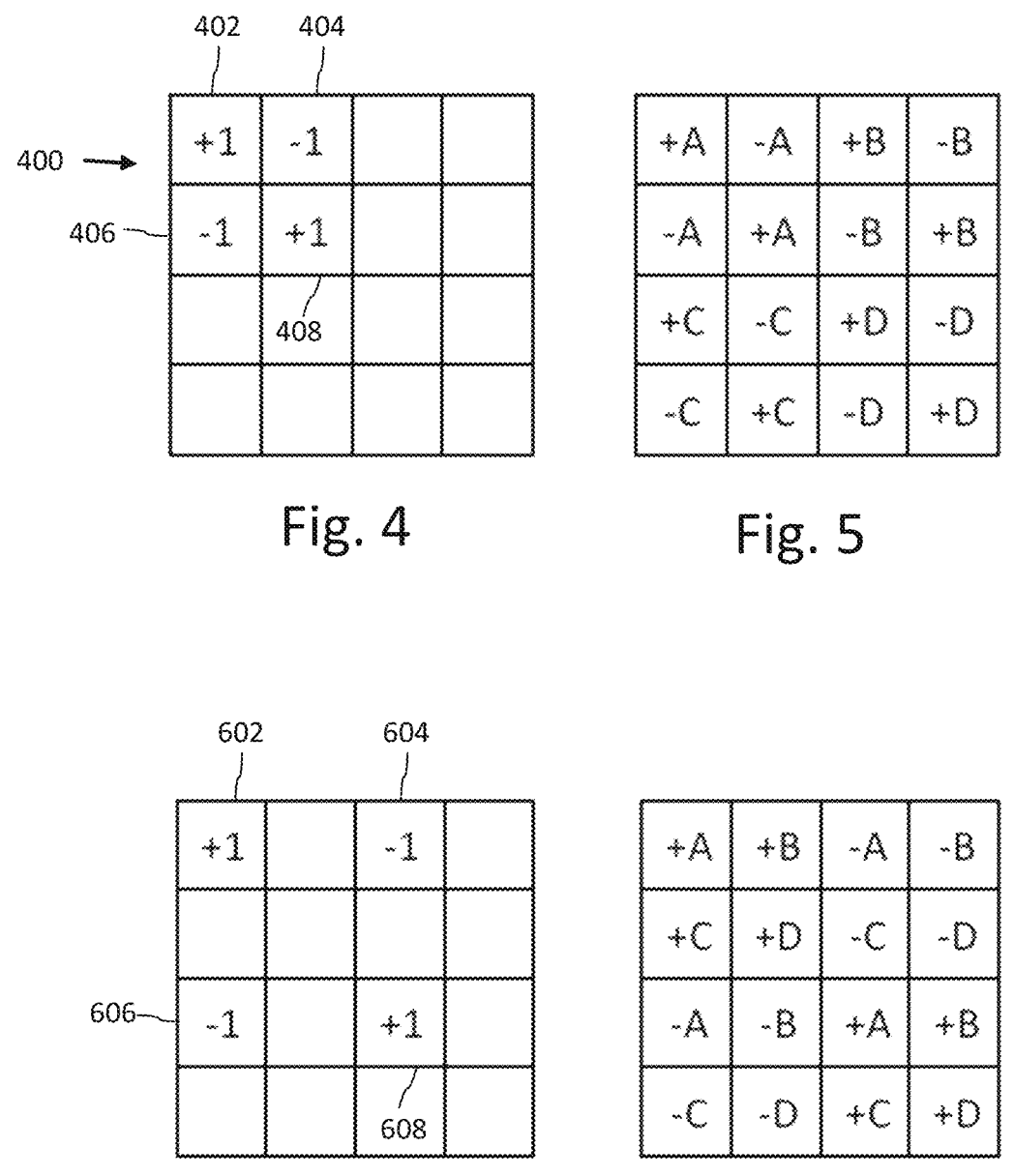

FIG. 4 illustrates a 4×4 arrangement of embedding locations in a sub-block of a tile. We refer to an embedding location, in some embodiments, as a "bit cell". See, e.g., FIGS. 41A-B in U.S. Pat. No. 5,862,260, for example. In the arrangement of FIG. 4, an auxiliary data signal element (e.g., a bit of the modulated carrier signal) is mapped to a neighboring set of 2×2 embedding locations (402, 404, 406, 408). Each bit cell in the set has a differential relationship with its horizontally and vertically adjacent neighbor, which in this case has opposite polarity. Along the diagonal, the bit cells have the same polarity.

Extending the example of FIG. 4, FIG. 5 illustrates the arrangement of 4 different data signal elements, A, B, C, D, each differentially encoded within the 4×4 arrangement of bit cells of FIG. 4. This arrangement may, of course, be expanded by repeating the same arrangement for additional data signal elements. In this particular arrangement applied to spatial domain embedding locations of a host image, mid to high frequencies are being utilized for embedding. This arrangement enables the decoder to exploit correlation of neighboring host signal values, yet may be susceptible to blurring.

Sparse Differential Modulation

FIG. 6 illustrates an example of a sparse differential encoding arrangement. Relative to FIG. 4, the embedding locations (602, 604, 606, 608) of an elementary data signal unit are spaced apart to form a signal that is more robust to blurring type distortion. The embedding locations are spaced in proximity to each other to exploit correlation of the host signal values within the area of the embedding locations.

Despite the fact that elementary data units are not mapped to adjacent embedding locations in a sparse scheme, the same data encoding capacity may still be achieved for the same area by interleaving the embedding locations of different data signal elements. FIG. 7 shows an example of interleaved data elements using the sparse differential encoding scheme of FIG. 6.

FIGS. 8-10 depict a frequency spectrum for each of three modulation patterns. FIG. 8 depicts the frequency spectrum of a data signal with pseudo-random mapping to embedding locations in a tile. FIG. 9 depicts the frequency spectrum of a data signal with dense differential mapping (e.g., from FIG. 5) to embedding locations in a tile. Finally, FIG. 10 shows the frequency spectrum of a data signal with sparse differential mapping (e.g., from FIG. 7) to embedding locations in a tile. The mapping patterns of FIGS. 4-7 can be extended and modified to have different spectral characteristics.

In designing the signal pattern, additional design considerations include geometric invariance as well as the ability to decode data reliably from small blocks of the suspect signal. In general, configuring the auxiliary data into a small pattern provides better invariance to geometric transformation. Additionally, it supports the second objective.

Signal Design for Perceptual Quality

In addition to robustness benefits, the signal patterns illustrated in the previous sections provide perceptual quality benefits over other schemes, such as the pseudo-random mapping scheme. For image based signaling, the human eye is less sensitive to modulation patterns in the diagonal direction. Thus, the diagonally dominated orientation of the differential modulation patterns enables signaling schemes that are less noticeable to humans. Additionally, the signal patterning employed enables the data signal to have spectral characteristics that reduce its visibility in host images.

Signal Design to Facilitate Synchronization

As noted above, for many applications, the data channel is expected to encounter distortion that will require that the data channel be designed to be robust to this distortion. For images, the signaling scheme often must be robust to geometric transformation, such as translation, rotation, and scale. Projective transformations of images present challenges in applications where signals are encoded on objects and captured with a 2D image sensor, used in cameras, scanners, etc. One cannot control the perspective at which a 2D sensor array captures the signal from an object, and as such, the signaling scheme needs to handle a range of perspective distortion. For signals with a temporal component, the scheme must be robust to temporal distortion, such as pitch invariant time scaling, and other time scaling and sampling distortion of audio signals.

The need for synchronization can be reduced by selecting data signaling schemes that are inherently robust to distortion. For example, the modulation of the host may be conducted in a domain that is robust to geometric or temporal distortion (e.g., Fourier magnitude coefficients robust to spatial or temporal translation). While this may reduce or simplify synchronization, it can limit other capabilities of the signaling scheme, like data capacity or perceptual quality. As a result, the signaling scheme often needs to be augmented with an explicit synchronization signal or may have an implicit synchronization signal.

Examples of explicit and implicit synchronization signals are provided in our previously cited U.S. Pat. Nos. 6,614,914, and 5,862,260. In particular, one example of an explicit synchronization signal is a signal comprised of a set of sine waves, with pseudo-random phase, which appear as peaks in the Fourier domain of the suspect signal. See, e.g., U.S. Pat. Nos. 6,614,914, and 5,862,260, describing use of a synchronization signal in conjunction with a robust data signal. Also see U.S. Pat. No. 7,986,807, which is hereby incorporated by reference.

Our US Publication 20120078989, which is hereby incorporated by reference, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, which are hereby incorporated by reference.

We now turn to a description of how to design signals to facilitate synchronization. The approach of encoding a data signal element in small regions or closely arranged embedding locations has benefits that we exploit for synchronization and data extraction. The decoder accumulates a detection metric from each of the small regions of the suspect signal. This approach accumulates discrimination statistics from the regions. These small regions used to encode signal elements are less sensitive than large regions to signal distortion that is spatially non-stationary, including geometric distortions, host signal interference and noise. However, a discrimination statistic from a small region tends to have large variance relative to the statistic from other regions. Therefore, we design a signal structure that enables the detector to combine lots of small region statistics to maintain geometric distortion invariance and improve statistical accuracy. The approach supports flexible shapes from which to sample a detection metric.

We begin a description of our synchronization approach with a first embodiment of a signal design. FIG. 11 depicts a sparse differential pattern. The letter "a" corresponds to a data signal element of the auxiliary signal being encoded. As we will explain in more detail, the synchronization approach can employ implicit synchronization signals (also referred to as self-synchronizing), explicit synchronization signals, or a combination of both. The implicit synchronization signal, is for example, the signal formed by the pattern of the variable data carrying elements, such as element "a." An explicit synchronization signal may be selected by dedicating some portion of a composite pattern of elements to a fixed signal.

Relative to the pattern of FIG. 6, the pattern of FIG. 11 is larger, expanding encoding of data element "a" to an arrangement of 8 embedding locations over a 4×4 region. We chose this structure to provide a more unique and recognizable pattern.

FIG. 12 depicts the sparse pattern of FIG. 11, extended to show additional data signal elements mapped to embedding locations. In the case where a data signal element corresponds to one message symbol or bit, for example, FIG. 12 illustrates the mapping of 8 bits into a 5×8 region of embedding locations. This pattern uses all available embedding locations by interleaving the embedding locations assigned to different message symbols.

Figure 13:
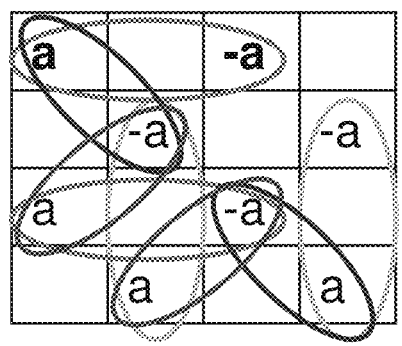
FIG. 13 illustrates that there are 8 differential relationships for the data signal element "a" in the arrangement of FIG. 11.

To exploit the differential arrangement of the pattern, the decoder employs a filter adapted to extract an estimate of a data element from the differential relationships of the pattern. The filter increases the signal to noise ratio of the data signal relative to noise by leveraging the differential relationship among the signals encoding each data element. FIG. 13 illustrates that there are 8 differential relationships for the data signal element "a" in this arrangement. The filter employs 8 comparisons to predict or reconstruct an estimate of the data signal. This filter may be employed both in the synchronization process as well as the data extraction process. The shape of the filter corresponds to the area from which it samples signal values and the positional relationship of the embedding locations that it evaluates to leverage the differential relationships. For example, the filter may be designed to combine comparisons of the signal values in the differential pairs to reduce host content and increase the data signal. Later, we elaborate further on various forms of filters and ways to represent and implement them.

Figure 14:
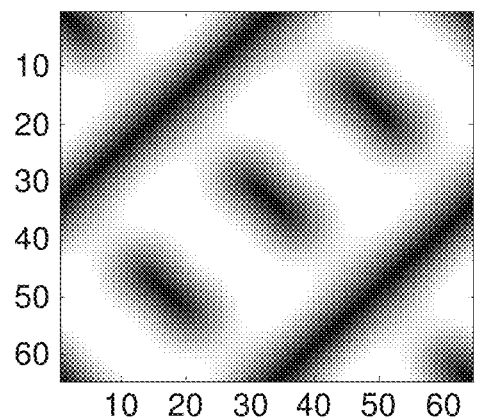
FIG. 14 illustrates the signal spectrum of the signal arrangement of FIGS. 11-12.
Figure 15:
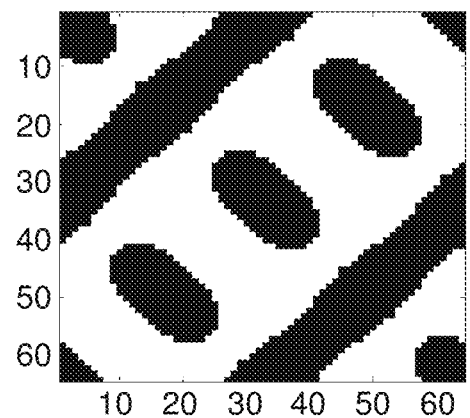
FIG. 15 depicts a threshold operation on the signal spectrum.
Figure 16:
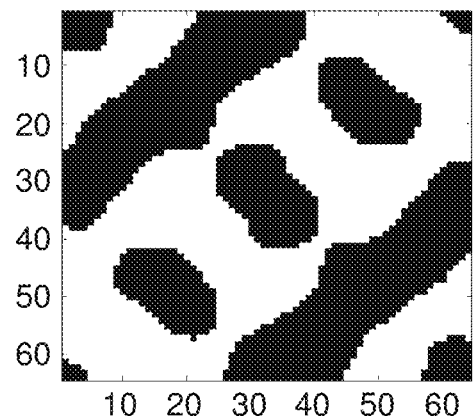
FIG. 16 shows the spectrum of the arrangement of FIGS. 14-15 after embedding.

FIG. 14 illustrates the signal spectrum of the signal arrangement of FIGS. 11-12. FIG. 15 depicts a threshold operation on the signal spectrum, and FIG. 16 shows the spectrum after embedding. These figures show that the spectrum has a structure that the detector can discriminate, facilitating synchronization using various detection schemes. We will highlight a few, in addition to the ones we incorporate from our patent documents.

Figure 17:
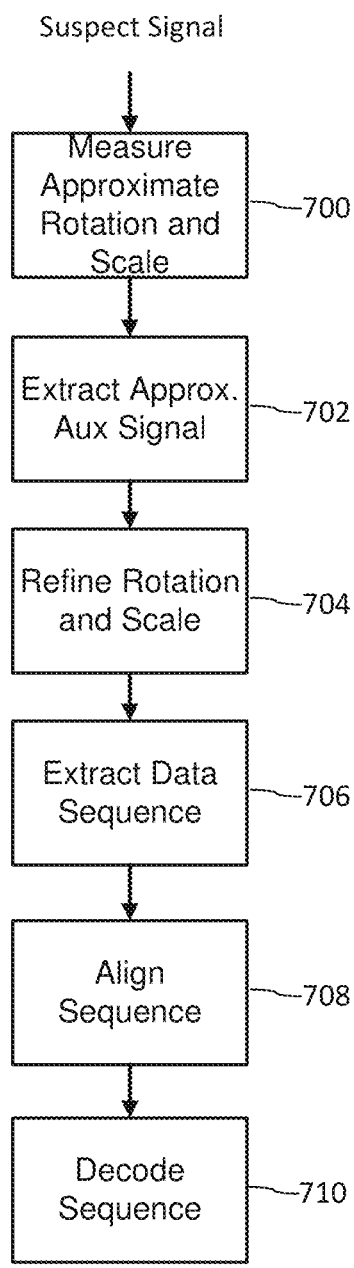
FIG. 17 is a flow diagram illustrating a method of decoding a signal encoded using the arrangement of FIG. 11.

FIG. 17 is a flow diagram illustrating a method of decoding a signal encoded using the arrangement of FIG. 11. In processing module 700, the method starts by approximating initial transform parameters, which in this case, include rotation and scale. This module includes preprocessing operations on the suspect signal to prepare it for detection. These operations include transforming the signal into the domain in which the data signal is encoded and filtering the signal to reduce interference with the host and other noise. For example, if the data channel is encoded in a particular color channel or channels at a particular resolution and frequency range, module 700 transforms the signal into the channel. This may include one or more filtering stages to remove noise and host signal content outside the channel.

Figure 18:
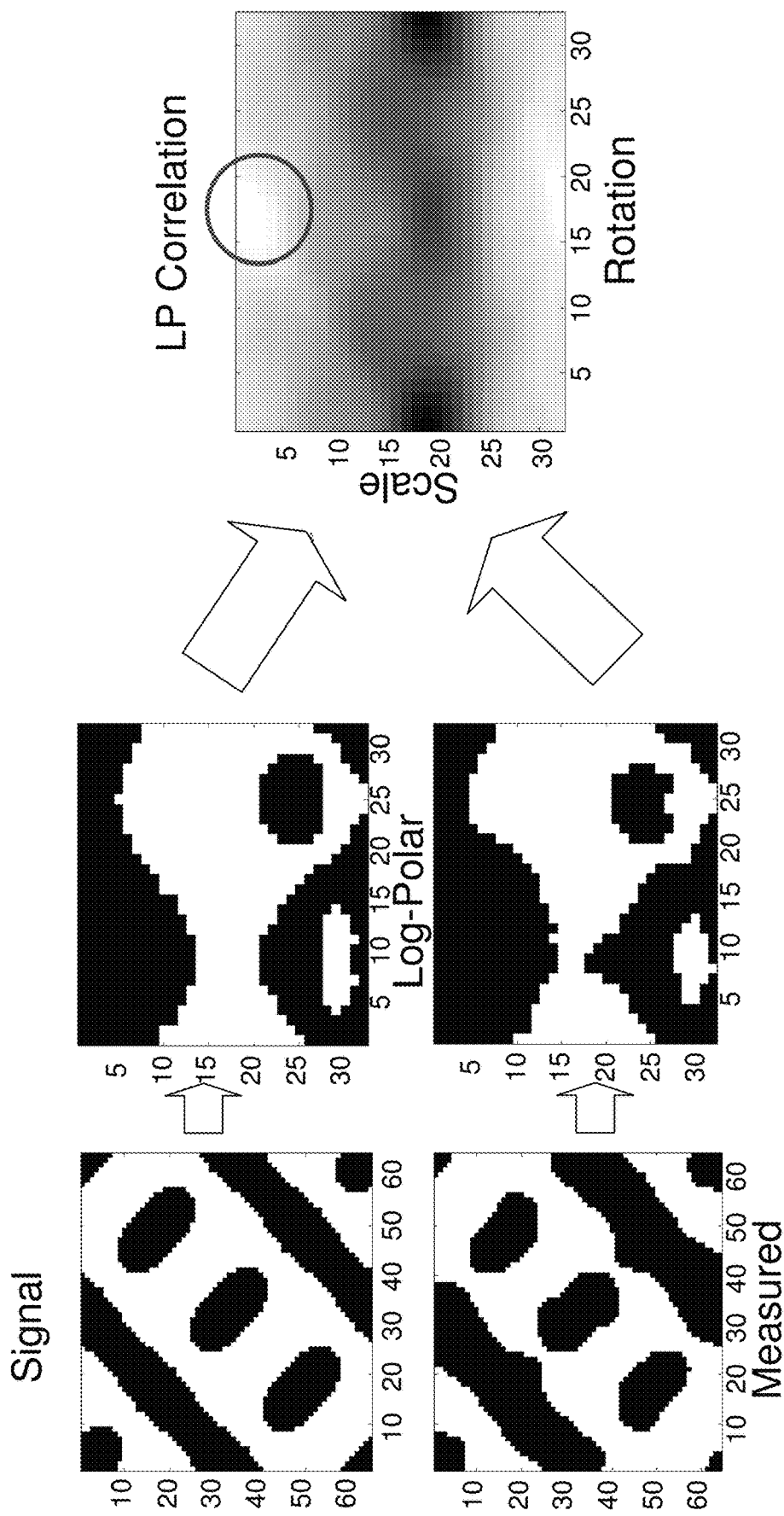
FIG. 18 illustrates one class of pattern detection methods in which a template (labeled "signal") and the filtered spectrum of a suspect signal (labeled "measured") are transformed into a log polar (LP) coordinate system and correlated with each other to produce a LP correlation.

Module 700 utilizes a pattern recognition method to approximate initial rotation and scale parameters of the encoded signal structure. As illustrated in FIGS. 14-16, the encoded signal structure has an arrangement that forms a template in the signal spectrum. There are a variety of pattern matching methods that may be employed to approximate the rotation and scale of this template in the suspect signal. FIG. 18 illustrates one class of such methods in which template (labeled "signal") and the filtered spectrum of the suspect signal (labeled "measured") are transformed into a log polar (LP) coordinate system and correlated. The maximum correlation peak in the correlation within the LP coordinate system is located. The location of this peak corresponds to the approximate rotation and scale of the template.

In one embodiment for image signaling, module 700 employs the following:

1. Bilateral and Gaussian filters to remove image content while preserving the encoded data signal;
2. Grayscale conversion, mean subtraction, and 2D FFT to estimate spatial frequencies;
3. Magnitude and Log-polar transform to equate 2D shift with rotation and scale; and
4. Clip magnitudes and Gaussian filter to remove processing artifacts and noise.

Figure 19:
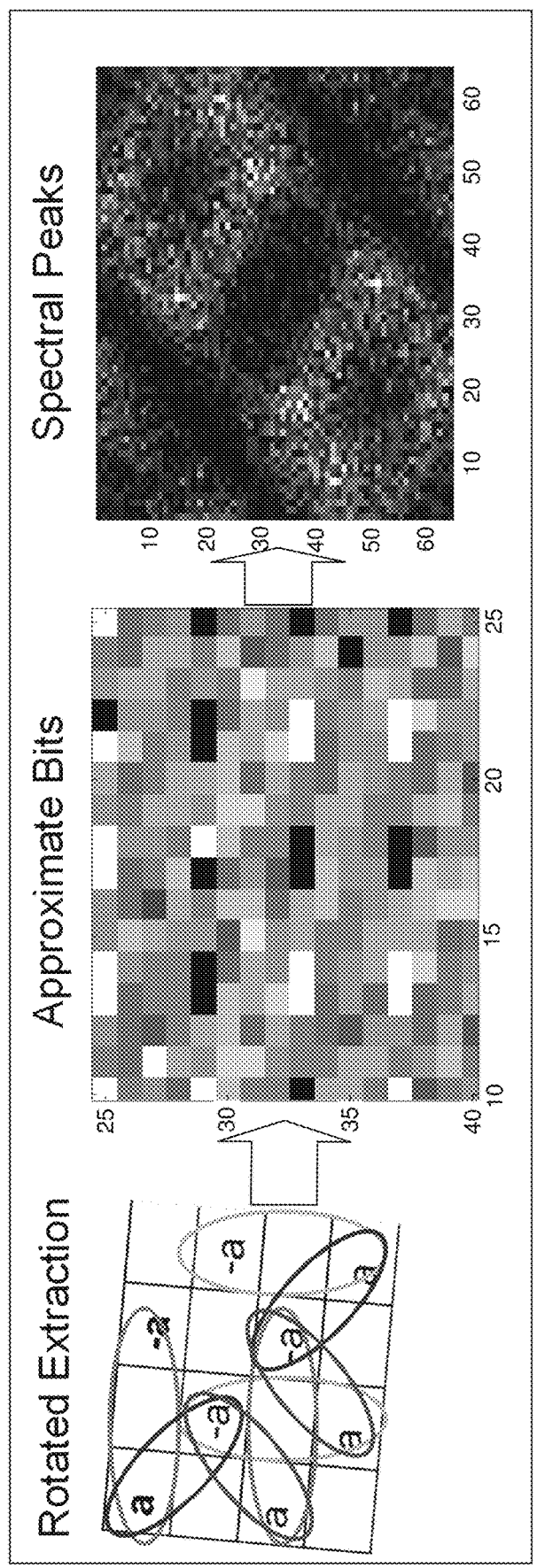
FIG. 19 shows an example of the approximated data signal ("approximate bits") and the spectrum of it to illustrate a process of refining synchronization parameters (in this case, rotation and spatial scale).

Returning to FIG. 17, signal extraction module 702 extracts an approximation of the auxiliary data signal using the initial rotation and scale estimate to compensate for rotation and scale. Module 702 includes sampling operators (e.g., interpolators) to sample embedding locations within the suspect signal, as corrected by the initial rotation and scale. Module 702 also includes an extraction filter that exploits the differential relationships used to encode signal elements as described previously to reconstruct an estimate of the data signal. FIG. 19 depicts an example of the filter pattern ("Rotated Extraction") applied at the initial rotation and scale, reconstructed data signal, and its spectrum. Below, we describe operation of extraction filters designed for a particular differential arrangement in more detail.

Module 704 accesses the reconstructed data signal and determines refined rotation and scale parameters that align it with the template. Module 704 computes the spectrum from the reconstructed estimate of the data signal. To illustrate, FIG. 19 shows an example of the approximated data signal and the spectrum of it. From this spectrum, the module 702 obtains a more precise estimate of rotation and scale. In particular, the location of the spectral peaks in the reconstructed data signal are used to determine the rotation and scale by determining the geometric transform that aligns them with the template. A variety of pattern matching techniques may be used for this process, including the log polar method above, and/or least squares approach of 20120078989, referenced earlier.

Additional refinement modules may be included to determine an estimate of translation of a tile in a suspect signal, as described in 20120078989 and U.S. Pat. No. 6,614,914, prior to extracting data. Translation provides the coordinates of the embedding locations within a tile of the suspect signal (e.g., start of tile and location of bit cells relative to start of tile). Oversampling may also be used to recover translation.

Data extraction module 706 now extracts a data sequence from embedding locations within a tile, which are sampled based on the refined geometric transformation parameters (refined rotation, scale, and translation). The data sequence extraction applies an extraction filter, again exploiting the differential encoding relationships as before, but this time with more precise determination of embedding locations.

Figure 20:
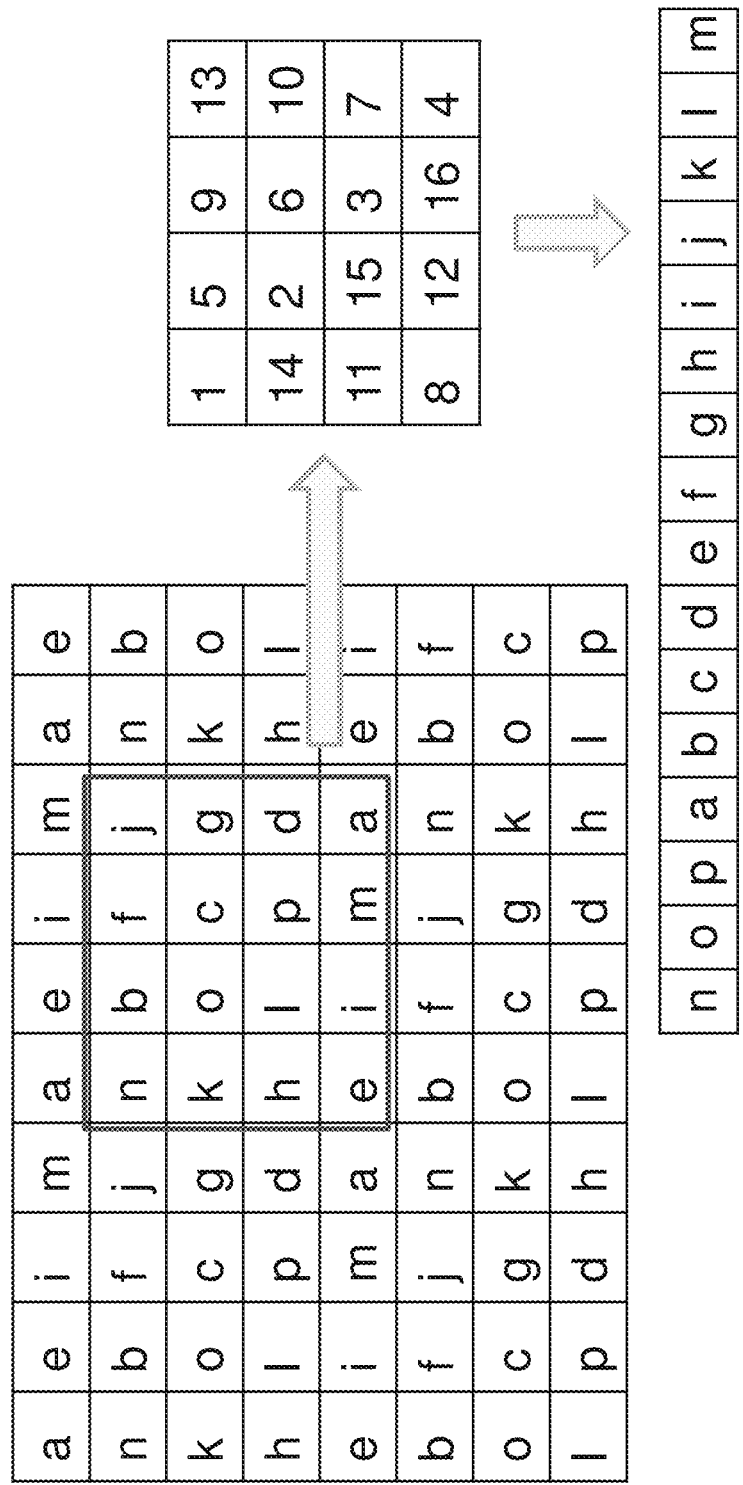
FIG. 20 illustrates a spiral encoding of a data sequence in 2D array of embedding locations, which is a scheme for making the data signaling robust to translational shifts (e.g., finding start of a data sequence in an arbitrary sample block of a suspect signal).

FIG. 20 illustrates a spiral encoding of a data sequence in 2D array of embedding locations. This type of encoding enables a 1D sequence to be extracted from an arbitrary start location. An alignment module 708 then determines the start of the sequence. There are a variety of techniques for aligning the 1D sequence. One approach is to use a fixed bit pattern in the 1D sequence that marks that start of a data sequence. Another approach is apply a decode operation on the sequence, and shift and repeat, each time computing and checking error detection bits in the string until a sequence without error is detected.

Sequence decode module 710 applies reverse operations of the data generator of FIG. 3, according to the data encoding protocol. Depending on the protocol, this may include demodulating bits from a carrier signal (if used) and/or combining estimates from repetition coding over bit cells to compute soft estimates of the error correction encoded symbols. These soft estimates are then error correction decoded (e.g., Viterbi decoding of convolutional coded message). The decoded bits are then checked for error (e.g., checking that fixed bits have correct sequence, and/or computing error detection bits and comparing them with the encoded error detection bits).

Figure 21:
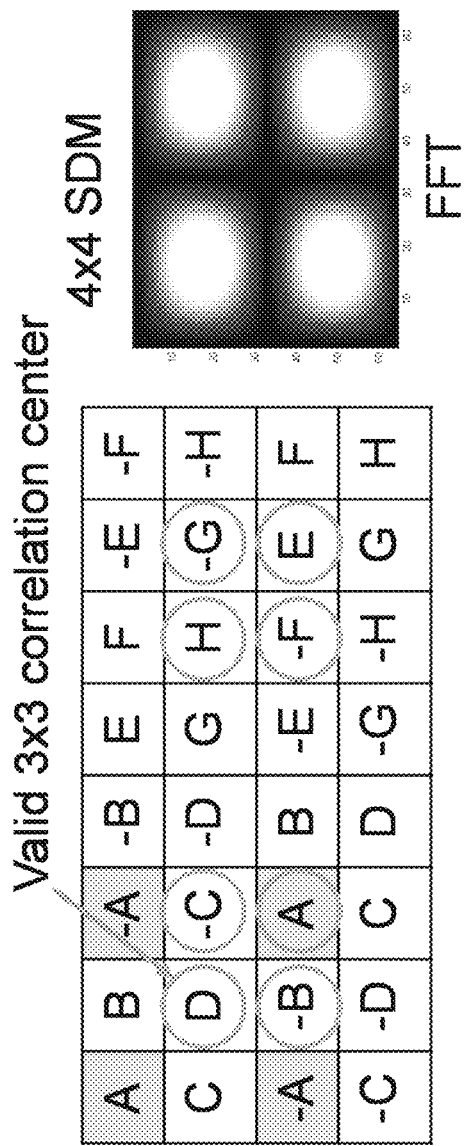
FIG. 21 is a diagram illustrating data signal tiles and the spectrum of the signal.
Figure 22:
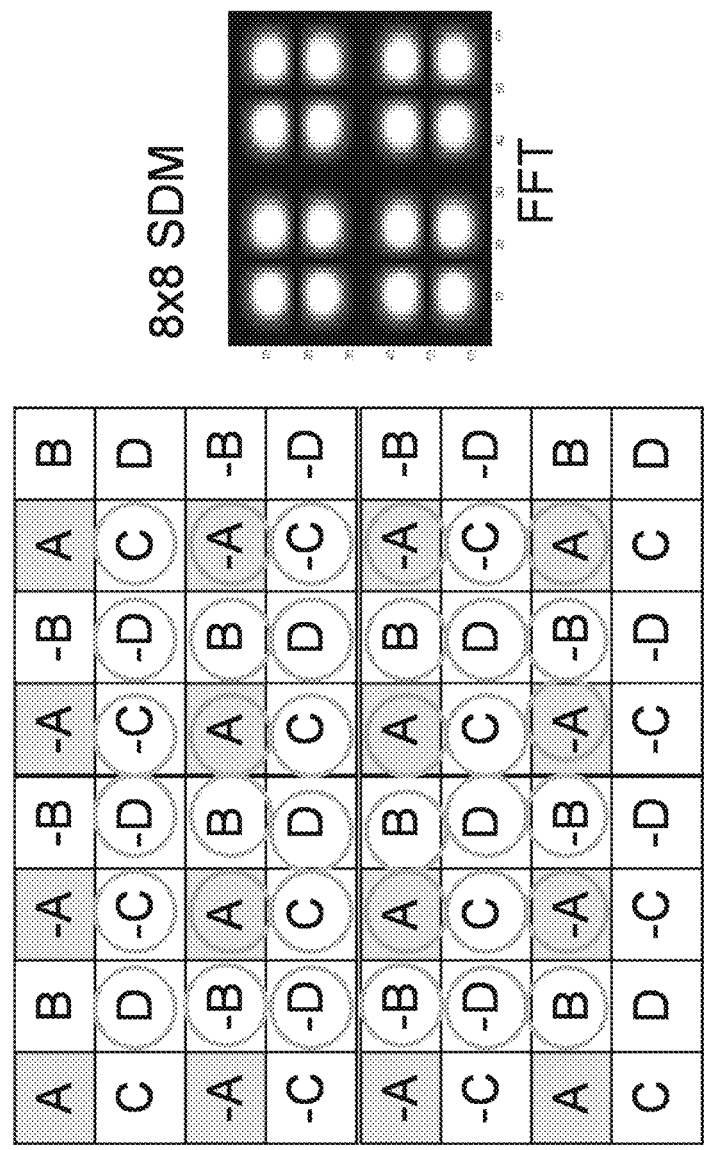
FIG. 22 is another diagram illustrating a data signal tile and its spectrum, where data elements are encoded with more redundancy.
Figures 23, 24:
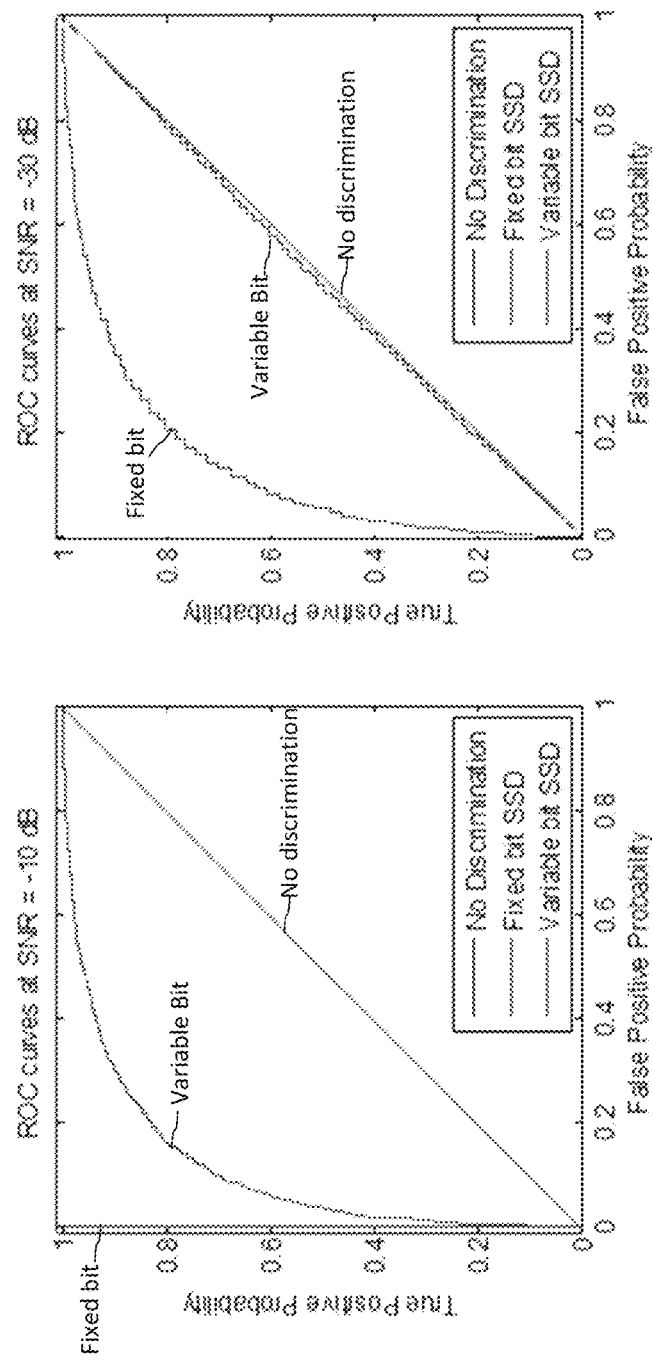
FIG. 23 is another example of a data pattern within a signal tile.
FIG. 24 is a diagram illustrating ROC curves of fixed and variable signaling schemes.

As initially depicted in the progression from FIG. 6 to FIG. 11, it is sometimes beneficial to repeat the pattern of bit cells representing a data element. FIGS. 21-23 illustrate examples of bit cell arrangements and correlation properties to highlight advantages of repetition. We sometimes refer to repetition of a bit cell pattern as "tiling" as it connotes repetition of elemental blocks adjacent to each other along at least one dimension in a coordinate system of an embedding domain. The benefits of tiling are manifested in at least a couple of ways. One benefit is that the repetition of a bit cell pattern creates an implicit structure that may be detected using various pattern detection methods. For example, the structure may form a template in a Fourier domain, auto-correlation domain, or some other transform domain. Another benefit is that repetition can increase the efficiency of correlation detectors, which we will illustrate in FIGS. 21-23. Ultimately, the utility of tiling within a particular application is dictated by design considerations outlined previously, including, perceptual quality, and efficiency of the detector, mitigating host signal interference, and facilitating discrimination of the data signal.

The left side of FIG. 21 illustrates two 4×4 tiles, side by side, each encoding 4 message elements. The first 4×4 tile encodes message elements, A, B, C and D. The second 4×4 tile encodes message elements E, F, G, and H. Both 4 by 4 tiles employ the differential scheme of FIG. 7. The right side of FIG. 21 depicts the spectrum of the tiles, as computed by taking an FFT of the signal.

To exploit the differential encoding for host suppression, a decoder employs a filter that compares differentially encoded bit cells for each message element. This filter may be employed for detection, synchronization and message extraction operations. The filter operation may be implemented by convolving a signal having pattern of the upper left 3×3 bit cells of FIG. 6 with the suspect signal, after it is transformed into the embedding domain. This filter may be depicted as:

$$\begin{bmatrix} 1 & 0 & -1 \\ 0 & 0 & 0 \\ -1 & 0 & 1 \end{bmatrix}$$

Assuming for the sake of illustration that the decoder is aligned with the data signal, the process of convolving this filter with this signal will yield valid correlations when the 3×3 filter center is located at the circled locations within the two tiles. A valid correlation is where the 3 by 3 filter pattern coincides with the location of a 3 by 3 pattern of bit cells for a data element (A, B, C, or D within tile 1, and E, F, G, or H, within tile 2). When the filter is located at the bit cells at the boundary of each 4×4 tile, it samples different message elements, yielding an invalid correlation. Thus, in the arrangement of FIG. 21, there are 4 of 16 embedding locations with valid correlations per tile. The output of this filter provides a detection metric (e.g., a measure of correlation) that may be aggregated across tiles to facilitate detection and synchronization, and across locations of message elements, to aggregate evidence of the value of each message element.

FIG. 22 is similar to FIG. 21, except that 4 message elements, A, B, C and D, are repeated over an 8 by 8 tile. The repetition of each element in FIG. 22 has doubled relative to FIG. 21. The corresponding spectrum, as computed with an FFT, is shown on the right side of FIG. 22. This doubling increases robustness and discrimination, yet reduces data capacity. When convolved with the same 3 by 3 filter, there are 36 of 64 embedding locations with valid correlations.

The non-correlating tile boundaries can be used for synchronization based on the formation of a grid of low correlation lines. This grid of lines forms a template that may be used to determine alignment of the tiles using pattern detection methods described herein.

FIG. 23 shows another example of a pattern arrangement within a tile to illustrate the point that there are many other possible bit cell patterns and tiling arrangements. Bit cell patterns for each message element, A, B, C or D, may be interleaved and oriented in different arrangements, and may be repeated at different rates. Some of the message elements may be repeated across tile boundaries so that they do not produce non-correlating boundaries.

Having illustrated several examples of differential arrangements and a filter that exploits them in the decoder, we now delve further into decoder operation. The signal patterns of FIGS. 4 and 6 correspond to differential signal kernels. FIG. 4 depicts a dense differential kernel, and relative to FIG. 4, FIG. 6 depicts a sparse differential kernel. These 2×2 and 3×3 signal kernels are more susceptible to noise and false positive correlations if data is recovered solely at a local level within a tile. The decoder improves the robustness of the signal recovery by combining the information from many small region statistics to get a composite signal metric for a larger portion of the suspect signal bigger than a tile.

We investigated effectiveness of our signaling systems by measuring receiver operating characteristics (ROC). FIG. 24 illustrates two sets of ROC curve plots for fixed and variable bit signaling schemes, one at a signal to noise ratio (SNR) of −10 dB, and the other at a SNR of −30 dB. The ROC curve is frequently used to compare the performance of diverse signaling systems. The ROC curve shows the true and false positive detection tradeoff of a particular receiver which indicates its ability to distinguish between signal and noise. The closer the ROC curve is to the left and upper axes, the better it is able to distinguish between signal and noise. A diagonal ROC curve (line) indicates that the receiver cannot distinguish signal and noise. In any system, as the strength of the noise increases, we expect the ROC curve to move closer to the diagonal.

We are interested here in comparing the ROC characteristics of the self-synchronizing differential (SSD) method with a fixed signal synchronization method. We start with an SSD payload over a 64 by 64 bit cell area which can carry a maximum of 4096/4=1024 bits if all the bits are allowed to vary independently. We compare the SSD tile with unknown bits to an SSD tile in which all the bits are known. This will show us how much the known data impacts signal recovery at the receiver. We do not use a cover signal (e.g., cover image) in the experiments, and the receiver processes a pure data tile corrupted by noise.

For the variable bit SSD watermark, the receiver convolves the noisy signal block with the following differential kernels:

$$d_1 = \begin{bmatrix} 1 & 0 & -1 \\ 0 & 0 & 0 \\ -1 & 0 & 1 \end{bmatrix} \text{ and } d_2 = \begin{bmatrix} 0 & 1 & 0 \\ -1 & 0 & -1 \\ 0 & 1 & 0 \end{bmatrix}$$

Here, $d_1$ is the differential kernel used to embed the data. The receiver then computes the binary correlation $c_i$ with each embedded variable bit as follows, $$c_i = \text{sign}(a_i \otimes d_1)\text{sign}(a_i \otimes d_1 - a_i \otimes d_2)$$

where $a_i$ is the suspect signal block corresponding to a binary payload bit $b_i$, and we have used the $\otimes$ symbol to represent the convolution operation. The signal metric is the overall block correlation obtained by summing the individual bit correlations.

The second differential kernel, $d_2$, represents just one option for filtering the suspect signal to provide an additional means to improve extraction of the variable signal relative to noise in the channel (including potential interference from a cover signal).

In the case of the fixed/known data bits $b_i$, the receiver computes the individual correlations as follows:

$$c_i = \text{sign}((a_i \otimes d_1) \cdot b_i)$$

and the signal metric is obtained by summing these individual bit correlations.

FIG. 24 shows the ROC curves for the variable and fixed bit SSD methods for the receiver implementations just described, at two different SNR levels −10 dB on the left and −30 dB on the right. It also shows the limiting case of no discrimination between signal and noise by the diagonal line in both plots. The fixed bit SSD ROC curve on the left plot is difficult to see because it coincides with the y-axis, indicating perfect discrimination between signal and noise at −10 dB. On the right plot, the variable bit SSD signaling method is nearly coincident with the diagonal ROC line, indicating no discrimination between signal and noise at −30 dB. At −10 dB SNR on the left plot, the ROC curve for the variable bit SSD method matches the ROC curve for the fixed bit SSD method at −30 dB shown on the right plot. This indicates that the fixed bit SSD can be detected at a noise level 20 dB below the variable bit SSD method. Although this may seem like a large gap in robustness, this comparison is limited to the case where the decoder is synchronized with the data signal.

In practice, the decoder must first synchronize the data signal, e.g., determine registration parameters (e.g., geometric transformation parameters for images) in addition to message signal extraction. It is possible that these additional factors may reduce the robustness gap between fixed and variable SSD signaling methods. Also further investigations may find better signal recovery methods for the SSD signal, which improve its ROC characteristics.

Above, we described various synchronization methods for determining the transformation of the embedding locations. Here, we describe an additional class of methods. The method of using a binary pattern that is a rotated version of the embedded SSD pattern to estimate the host signal interference can be expanded to include more rotated and scaled versions of the same pattern. In such an approach, the decoder computes the signal metrics from applying pairs of these filters to a suspect image to produce a vector signal metric or feature vector. These feature vectors are computed for various rotations and scales of a randomly chosen pure data tile. Since the feature vectors track the statistical characteristics of the data, they are quite stable and independent of the chosen data tile.

A refinement of this method is to compute the averaged feature vectors over multiple samples of random data tiles. Then, for an embedded image with an unknown rotation and scale, the decoder computes the feature vector and correlates it against the pre-computed list of feature vectors. The rotation and scale corresponding to the vector with the maximum correlation provides an estimate for the image transform.

Examples of templates used in the feature vector computations are as follows $$\begin{bmatrix} 1 & -1 \\ -1 & 1 \end{bmatrix}, \begin{bmatrix} 0 & -1 & 0 \\ 1 & 0 & 1 \\ 0 & -1 & 0 \end{bmatrix}, \begin{bmatrix} 1 & 0 & -1 \\ 0 & 0 & 0 \\ -1 & 0 & 1 \end{bmatrix},$$

$$\begin{bmatrix} 1 & 0 & 0 & -1 \\ 0 & 0 & 0 & 0 \\ 0 & 0 & 0 & 0 \\ -1 & 0 & 0 & 1 \end{bmatrix}, \begin{bmatrix} 0 & 0 & -1 & 0 \\ 1 & 0 & 0 & 0 \\ 0 & 0 & 0 & 1 \\ 0 & -1 & 0 & 0 \end{bmatrix}, \begin{bmatrix} 0 & -1 & 0 & 0 \\ 0 & 0 & 0 & 1 \\ 1 & 0 & 0 & 0 \\ 0 & 0 & -1 & 0 \end{bmatrix},$$

$$\begin{bmatrix} 0 & 0 & 0 & -1 & 0 \\ 1 & 0 & 0 & 0 & 0 \\ 0 & 0 & 0 & 0 & 0 \\ 0 & 0 & 0 & 0 & 1 \\ 0 & -1 & 0 & 0 & 0 \end{bmatrix}, \begin{bmatrix} 0 & 0 & -1 & 0 & 0 \\ 0 & 0 & 0 & 0 & 0 \\ 1 & 0 & 0 & 0 & 1 \\ 0 & 0 & 0 & 0 & 0 \\ 0 & 0 & -1 & 0 & 0 \end{bmatrix}, \begin{bmatrix} 0 & -1 & 0 & 0 & 0 \\ 0 & 0 & 0 & 0 & 1 \\ 0 & 0 & 0 & 0 & 0 \\ 1 & 0 & 0 & 0 & 0 \\ 0 & 0 & 0 & -1 & 0 \end{bmatrix},$$

$$\begin{bmatrix} 0 & 0 & 0 & -1 & 0 & 0 \\ 0 & 0 & 0 & 0 & 0 & 0 \\ 1 & 0 & 0 & 0 & 0 & 0 \\ 0 & 0 & 0 & 0 & 0 & 1 \\ 0 & 0 & 0 & 0 & 0 & 0 \\ 0 & 0 & -1 & 0 & 0 & 0 \end{bmatrix}, \begin{bmatrix} 0 & 0 & -1 & 0 & 0 & 0 \\ 0 & 0 & 0 & 0 & 0 & 0 \\ 0 & 0 & 0 & 0 & 0 & 1 \\ 1 & 0 & 0 & 0 & 0 & 0 \\ 0 & 0 & 0 & 0 & 0 & 0 \\ 0 & 0 & 0 & -1 & 0 & 0 \end{bmatrix},$$

$$\begin{bmatrix} 0 & 0 & 0 & -1 & 0 & 0 & 0 \\ 0 & 0 & 0 & 0 & 0 & 0 & 0 \\ 0 & 0 & 0 & 0 & 0 & 0 & 0 \\ 1 & 0 & 0 & 0 & 0 & 0 & 1 \\ 0 & 0 & 0 & 0 & 0 & 0 & 0 \\ 0 & 0 & 0 & 0 & 0 & 0 & 0 \\ 0 & 0 & 0 & -1 & 0 & 0 & 0 \end{bmatrix},$$

In this illustration, there are 12 correlation patterns, so choosing pairs of these in the metric computation results in $$\binom{12}{2} = 66$$

pairwise metrics, so the feature vector has 66 parameters corresponding to every rotation and scale of an image. It is observed that the feature vector parameters vary smoothly as the rotation and scale parameters vary, so a discrete sampling of the parameter space enables the decoder to estimate parameters which lie in between the sampling grid.

To determine the effectiveness of the feature vectors in identifying the rotation and scale parameters, we compute a confusion matrix of the feature vector, which is the correlation between feature vectors at different rotations and scales. If the confusion matrix is nearly diagonal, that means that the feature vectors are uncorrelated and may be used to accurately estimate the rotation and scale parameters. If the confusion matrix is nearly equal valued, that means that the feature vectors are highly correlated and are unable to distinguish one pair of rotation and scale parameters from another.

We swept the data tile over the rotation steps of 0:10:90 degrees and scale steps of 0.5:0.1:1.5, in Matlab vector notation. Each feature vector was normalized to have zero mean and unit variance. In all, we obtained 110 feature vectors of length 66 each. The confusion matrix is obtained by cross multiplying all pairs of feature vectors arranged in a square array. The correlation values on the diagonal of this matrix are the highest values in the matrix and represent the correlation of each feature vector with itself and must equal 1 because of the normalization. We found that the confusion matrix with the computed feature vectors was nearly diagonal and the correlation vectors which were 90 degrees apart were highly correlated, which is expected since the embedding pattern had a 90 degree rotational symmetry.

We compared the confusion matrix obtained from a pure data signal with one obtained for the data signal embedded in a host image. We applied a prediction filter, called octaxis, to suppress the host signal interference and computed the feature vectors as before sweeping through the same scales and rotations. For more on prediction filters, see our U.S. Pat. Nos. 7,076,082 and 8,687,839, which are hereby incorporated by reference. The confusion matrix is similar to the matrix obtained with the pure data tile. This suggests that the feature vectors computed for a pure data tile may be used to estimate the rotation and scale parameters of a data signal embedded in a cover signal, such as an image.

We tested this method on scans of images embedded with a sparse differential message payload. Our tests showed that the feature-based method can recover a transform based on the sparse differential payload alone and does not require a separate synchronization signal.

Orthogonal Differential Patterns

As demonstrated above, it is beneficial to exploit smoothness and commonly occurring cover signal features (e.g., such as lines and edges within image content, or frequency spectra of temporally adjacent frames of audio) while embedding a watermark signal. Our signal extraction filters use this approach to cancel/suppress host signal variations. One such filter is an octaxis filter, as noted above. Oct axis compares a bit cell with eight neighbors to provide a compare value (e.g., +1 for positive difference, −1 or negative difference), and sums the compare values. Different arrangements of neighbors and weights may be applied to shape the filter according to different functions. Another is a cross shaped filter, in which a sample of interest is compared with an average of horizontal neighbors and vertical neighbors, as described in U.S. Pat. No. 6,614,914, previously incorporated herein.

The filter output is further enhanced when the data signal is differentially embedded.

A basic kernel for differential modulation is the 2×2 matrix introduced in FIG. 4:

$$\begin{bmatrix} 1 & -1 \\ -1 & 1 \end{bmatrix}$$

However, this kernel is susceptible to blurring and sampling offsets. An expanded version of the kernel, as introduced in FIG. 6, may be more suitable in practice:

$$\begin{bmatrix} 1 & 0 & -1 \\ 0 & 0 & 0 \\ -1 & 0 & 1 \end{bmatrix}$$

These kernels may be used to tile bit cells in a non-overlapping fashion shown in FIG. 7, where each of the letters represents the data embedded by each kernel. The encoder embeds 4 message elements, (A, B, C, D), in every 16 embedding locations in the embedding domain of the channel. This gives us an embedding efficiency of 4/16=0.25 bits/embedding location, where the message elements are bits.

If we allow for overlap between the differential embedding patterns, the embedding efficiency may be improved.

For example, consider the differential embedding patterns produced by products of the two zero-mean, orthogonal vectors:

$$u = \begin{bmatrix} 1 \\ 0 \\ -1 \end{bmatrix}, v = \begin{bmatrix} -1 \\ 2 \\ -1 \end{bmatrix}$$

We have $$uu^T = \begin{bmatrix} 1 & 0 & -1 \\ 0 & 0 & 0 \\ -1 & 0 & 1 \end{bmatrix}, uv^T = \begin{bmatrix} -1 & 2 & -1 \\ 0 & 0 & 0 \\ 1 & -2 & 1 \end{bmatrix},$$

$$vu^T = \begin{bmatrix} -1 & 0 & 1 \\ 2 & 0 & -2 \\ -1 & 0 & 1 \end{bmatrix}, vv^T = \begin{bmatrix} 1 & -2 & 1 \\ -2 & 4 & -2 \\ 1 & -2 & 1 \end{bmatrix}$$

Notice that the matrix for $uu^T$ is the same differential kernel that we introduced earlier. We may then embed 4 bits A, B, C, D in a 3×3 arrangement of embedding locations as follows:

$$X = Auu^T + Buv^T + Cvu^T + Dvv^T$$

This yields an embedding efficiency of 4 of 9 embedding locations=0.44 bits/embedding location. To extract the individual data, the decoder uses the orthogonality property of the two basis vectors $u^T v = 0$. For example, to extract the bit B, the decoder applies an extraction filter based on the embedding vector used to encode that bit. The filter operation may be represented as: $u^T X v = B u^T u v^T v = B\|u\|^2 \|v\|^2$, and hence $B = u^T X v / \|u\|^2 \|v\|^2$. Similarly, $A = u^T X u / \|u\|^4$, etc.

In differential embedding, the encoder embeds data elements in the pairwise differences of host signal values at embedding locations (e.g., pixel values of images, transform domain coefficients of images, audio or video, etc.). Since the vectors u and v are zero mean, extracting the data nulls out any smooth host signal variations. Hence, we may view this embedding process as a generalization of pairwise differential embedding.

One drawback of the embedding vectors u and v is that the vector u has a zero in its support. Hence, the embedding patterns do not cover all the potential embedding locations, which may result in a loss of robustness. One example of alternative vectors which satisfy the same properties and that also have non-zero support is the pair:

$$u = \begin{bmatrix} 4 \\ -5 \\ 1 \end{bmatrix}, v = \begin{bmatrix} 2 \\ 1 \\ -3 \end{bmatrix}$$

Since we have improved the embedding efficiency, we may trade off some of the bits to embed a reference pattern for synchronization.

Figure 25:
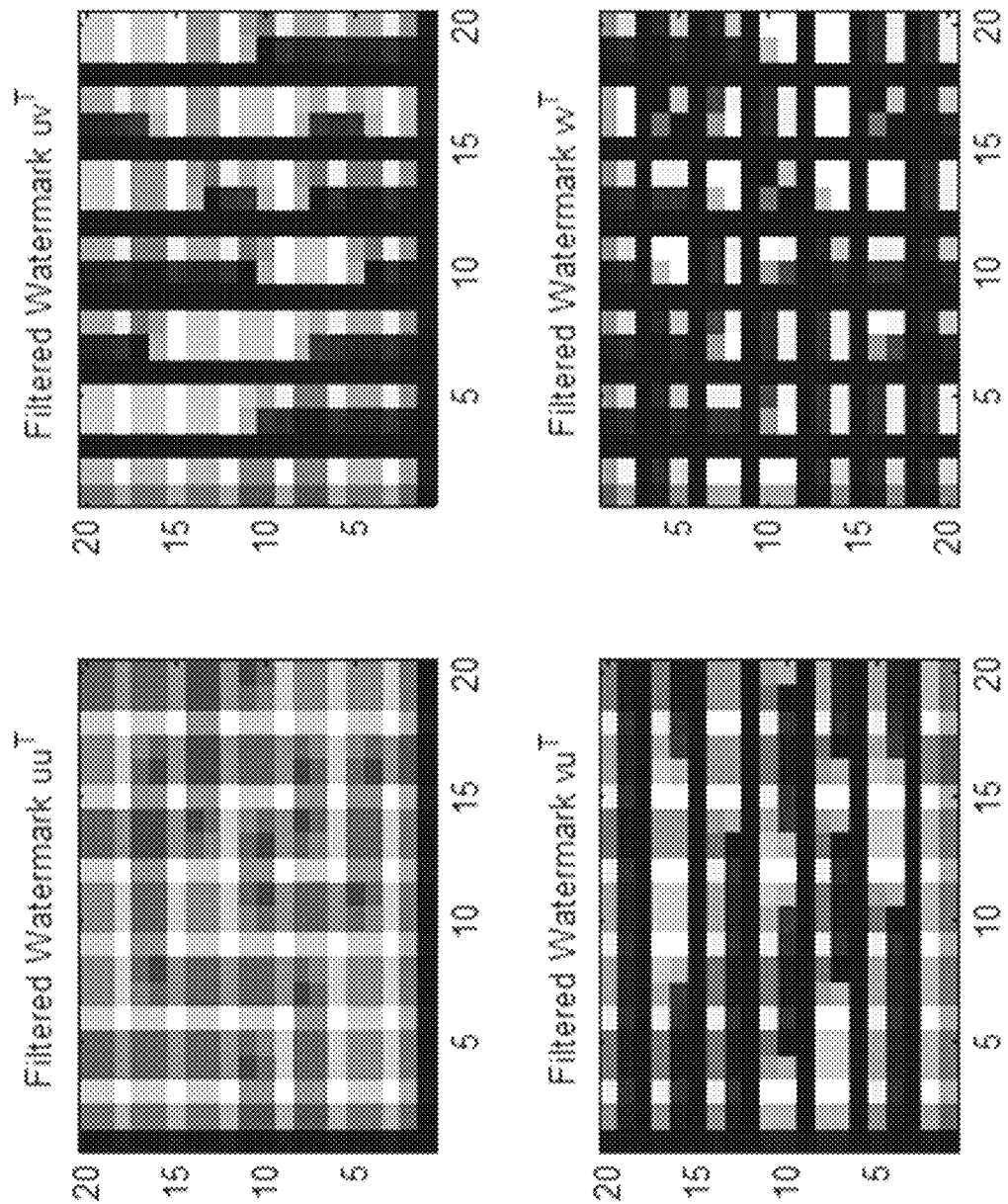
FIG. 25 illustrates examples of filtered data signals obtained by applying an extraction filter.

FIG. 25 illustrates examples of filtered data signals obtained by applying an extraction filter. If we embed only one out of the four bits, say $X = Auu^T$, we obtain the patterns shown in FIG. 25 during extraction. FIG. 25 shows subplots of filtered images for the pure data signal, $X = Auu^T$, without any host signal content. Examining FIG. 25, one will notice that the extraction filters corresponding to the embedded data produce peaks at the data locations as seen in the top left subplot (bright cells), whereas the other filters produce pure nulls (black cells) at the data locations, since there is no interfering host signal content. In particular, the nulls for filter $vv^T$ (shown in the lower right subplot) produce a square grid whose intersections correspond to the embedded data.

The pattern of nulls form a registration pattern or template that may be used as a guide for reading the data in host signal which has been geometrically distorted. As such, variants of the template matching methods described previously may be used to synchronize the decoder with the data signal. One method would be to:

1. Apply filter to suspect signal (e.g., convolve filter kernel with suspect signal, where the filter kernel is based on the embedding vector as detailed above);

2. Detect nulls to obtain a detected pattern of nulls;

3. Approximate rough candidate of orientation by determining rotation and scale that provides best fit between a template and detected pattern of nulls;

4. Reapply filters at candidate rotation and scale and refine candidate as described above.

Another method is to apply filter kernels at candidate orientations and select the candidate orientation that produces the strongest composite detection metrics (e.g., aggregate correlation measure by summing correlation metrics across tiles).

Figure 26:
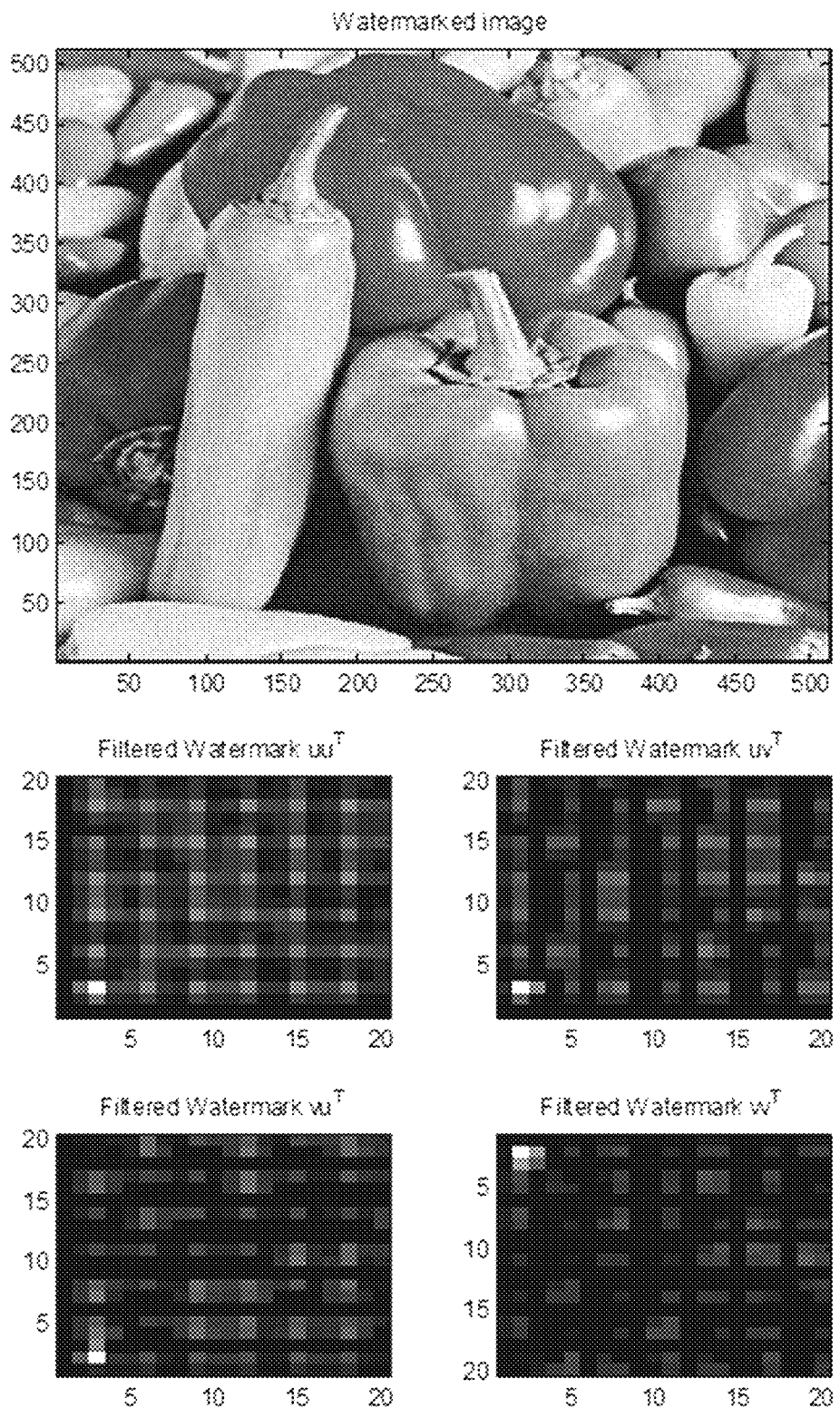
FIG. 26 provides an example of an encoded host signal ("watermarked image"), followed by subplots of the output produced by applying extraction filters to the watermarked image.

When the data signal is embedded within host signal content, such as an image, the application of these filters to the suspect signal no longer provides a filtered output signal with perfect nulls. However, there are still local minima corresponding to the nulls. FIG. 26 provides an example of a watermarked image, followed by subplots of the output produced by applying extraction filters to the watermarked image. Again, the embedded data signal is: $X=Auu^T$. The mixing of the host and data signal has the effect depicted in these subplots relative to FIG. 25. The bit cells for a data signal are no longer as bright, and the locations of the nulls are now minima, instead of pure nulls. As introduced earlier, the embedder module may further adapt the data in the B, C, and D channels to cancel out host signal content and enhance the synchronization nulls. The differential relationships may be adjusted by adjusting the amount of the alterations to the host signal at the embedding locations in a differential pairing.

Figure 27:
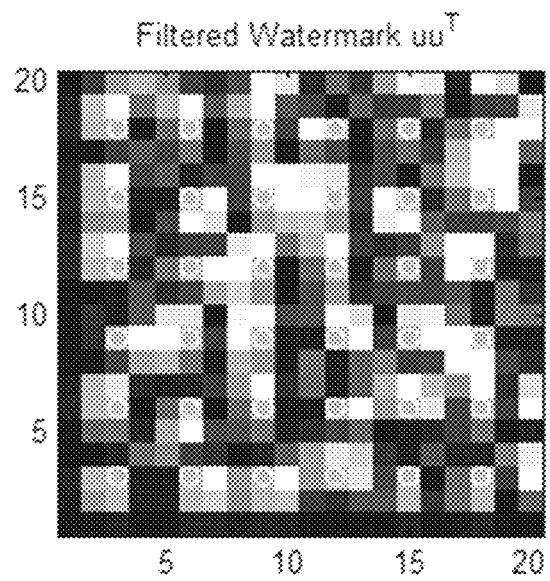
FIG. 27 shows filtered signals, with the first three subplots showing filtering corresponding to bit cells were data has been encoded, and a fourth subplot showing filtering corresponding to bit cells where no data has been encoded, to highlight a pattern of minima in the filtered output.
Figure 27:
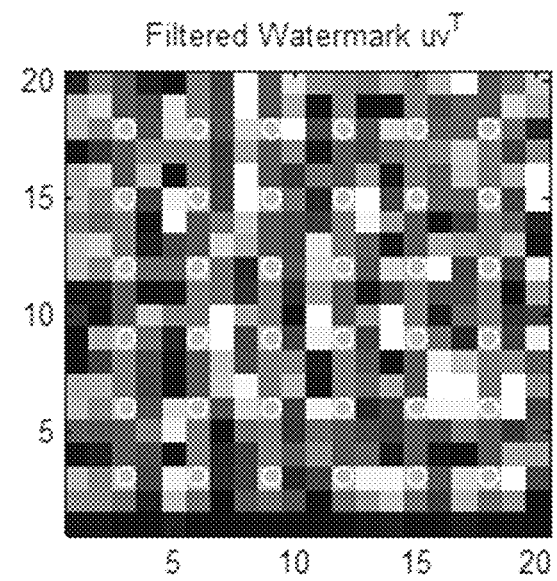
Figure 27:
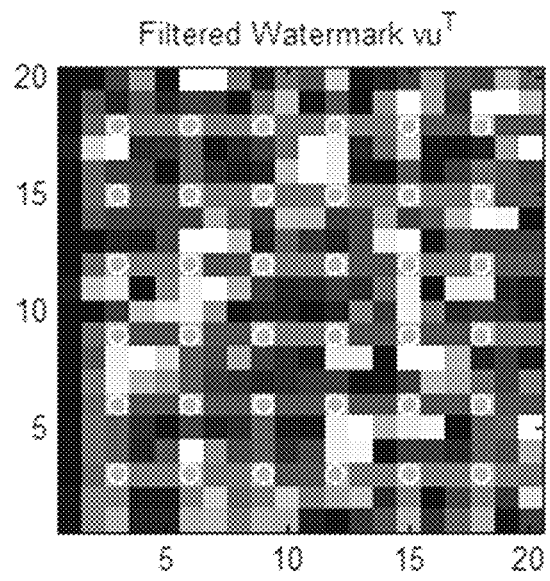
Figure 27:
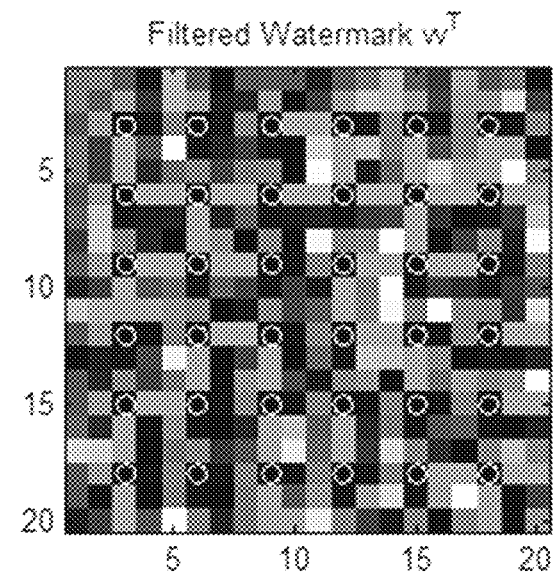

If the encoder embeds more data, we do not see the square mesh, but only nulls in the dimensions that are not embedded. FIG. 27 shows a filtered watermark signal corresponding to $X=Auu^T+Buv^T+Cvu^T$, so only the D channel is not embedded. The filtered images show the data in each of the A, B and C channels and nulls only in the D channel. Here we have overlaid circles to show the data locations, since they do not correspond to local peaks in the filtered data.

There is a general procedure for creating differential embedding patterns of any size. Computing the Singular Value Decomposition (SVD) of a random matrix produces a random orthogonal matrix. For differential modulation that enables better host signal suppression, we want the additional property that the columns have zero mean. This is equivalent to saying that the vectors are orthogonal to the all ones vector $1^T u=0$, where $1^T=[1, 1, \ldots, 1]$. Hence, any orthogonal matrix in which the first column is the all ones vector 1, will suffice. We may take a random orthogonal matrix and divide its rows by the first element in each row to obtain such a matrix.

$$\begin{bmatrix} u_{11} & u_{12} & u_{13} \\ u_{21} & u_{22} & u_{32} \\ u_{31} & u_{32} & u_{33} \end{bmatrix} \xrightarrow{yields} \begin{bmatrix} 1 & u_{12}/u_{11} & u_{13}/u_{11} \\ 1 & u_{22}/u_{21} & u_{32}/u_{21} \\ 1 & u_{32}/u_{31} & u_{33}/u_{31} \end{bmatrix}$$

It is highly unlikely that a random orthogonal matrix will have zeros, so the divide by zero probability is negligible.

A more systematic way of obtaining differential orthogonal vectors of any size is to use orthogonal basis functions. One such example is the DCT basis. The first few DCT basis are $$DCT(2): u_1 = \begin{bmatrix} 1 \\ 1 \end{bmatrix}, u_2 = \begin{bmatrix} 1 \\ -1 \end{bmatrix}$$

$$DCT(3): u_1 = \begin{bmatrix} 1 \\ 1 \\ 1 \end{bmatrix}, u_2 = \begin{bmatrix} 1 \\ 0 \\ -1 \end{bmatrix}, u_3 = \begin{bmatrix} -1 \\ 2 \\ -1 \end{bmatrix}$$

$$DCT(4): u_1 = \begin{bmatrix} 1 \\ 1 \\ 1 \\ 1 \end{bmatrix}, u_2 = \begin{bmatrix} 2.4142 \\ 1 \\ -1 \\ 2.4142 \end{bmatrix},$$

$$u_3 = \begin{bmatrix} 1 \\ -1 \\ -1 \\ 1 \end{bmatrix}, u_4 = \begin{bmatrix} 1 \\ -2.4142 \\ 2.4142 \\ -1 \end{bmatrix}$$

Note that the basis corresponding to DCT(3) are the same as those used to generate the patterns we discussed earlier. Data signal generation may apply rotation matrices with arbitrary angles to the DCT basis to generate other orthogonal matrices of the same size.

If embedding capacity is a priority, the orthogonal differential modulation approach may be adapted as follows. If not restricted to zero mean, the data signal generation may start with any orthogonal matrix as a basis and obtain $N^2$ overlapping patterns with a N×N support, so the embedding efficiency is 1 bit/embedding location.

Signal generation can use all the patterns except the $1^T 1$ pattern, i.e. the square all ones pattern. The embedding efficiency is $(N^2-1)/N^2=1-1/N^2$, which approaches 1 bit/pixel for large N. For N=2, for example, we can embed ¾=0.75 bits/embedding location using the following overlapping embedding patterns $$u_1 u_2^T = \begin{bmatrix} 1 & -1 \\ 1 & -1 \end{bmatrix}, u_2 u_1^T = \begin{bmatrix} 1 & 1 \\ -1 & -1 \end{bmatrix}, u_2 u_2^T = \begin{bmatrix} 1 & -1 \\ -1 & 1 \end{bmatrix}$$

We need not restrict the synchronization signal to the nulls of the watermark signal. We may reserve a subset of the data channels to carry an explicit reference signal, such as a collection of sine waves with pseudo random phase, and other data channels may be used for host suppression.

Since we have a lot of freedom in generating embedding patterns, we may choose a basis appropriate for a particular class of images. The DCT is the basis for the most general class of images. For a specialized class of images, such as line art images, we may find use for a more specific basis.

For example, a specific basis for a class of images may derived by applying the principles of the Karhunen-Loève theorem and transform (KLT), or the principles of Principal Component Analysis (PCA).

Exemplary Embodiments

General Encoding Methods 1.0 (A) A method of steganographically encoding a watermark signal within an electronic host media signal representing an array of media elements, wherein each of the media elements is characterized by a media element value, the method comprising:

obtaining a first modulation kernel characterized by a set of modulation elements, each of which is assigned a modulation value, wherein the first modulation kernel represents a matrix obtained by a process that includes obtaining a first outer product of a first vector and a vector selected from the group consisting of the first vector and a second vector orthogonal to the first vector; and altering portions of the host media signal based on the first modulation kernel such that media element values for a first set of the media elements are modulated in accordance with modulation values assigned to corresponding modulation elements in the first modulation kernel.

For example, if first vector, $$u = \begin{bmatrix} 1 \\ 0 \\ -1 \end{bmatrix};$$

and second vector, $$v = \begin{bmatrix} -1 \\ 2 \\ -1 \end{bmatrix},$$

then first outer product could be u⊗u (i.e., $uu^T$), u⊗v (i.e., $uv^T$), or v⊗u (i.e., $vu^T$). So, the embedding kernel may be obtained by $$uu^T = \begin{bmatrix} 1 & 0 & -1 \\ 0 & 0 & 0 \\ -1 & 0 & 1 \end{bmatrix},$$

$$uv^T = \begin{bmatrix} -1 & 2 & -1 \\ 0 & 0 & 0 \\ 1 & -2 & 1 \end{bmatrix}, \text{ or } vu^T = \begin{bmatrix} -1 & 0 & 1 \\ 2 & 0 & -2 \\ -1 & 0 & 1 \end{bmatrix},$$

wherein the value of each kernel element is a modulation value.

1.1 The method of embodiment 1.0 (A), wherein the first vector is a zero-mean vector.

1.2 The method of embodiment 1.0 (A), wherein the first vector is a non-zero-mean vector.

1.3 The method of any of embodiments 1.0 (A) to 1.2, wherein the first vector consists of binary coefficients.

Coefficients of the first vector need not be binary (i.e., 1, 0 or −1). The coefficients can include any real number.

1.4 The method of any of embodiments 1.0 (A) to 1.3, wherein the first vector comprises at least one non-zero coefficient.

1.5 The method of any of embodiments 1.0 (A) to 1.4, wherein the first vector comprises at least one zero coefficient.

1.6 The method of any of embodiments 1.0 (A) to 1.5, wherein the first vector consists of non-zero coefficients.

1.7 The method of any of embodiments 1.0 (A) to 1.6, wherein obtaining the first outer product comprises obtaining an outer product of the first vector and the first vector.

1.8 The method of any of embodiments 1.0 (A) to 1.7, wherein obtaining the first outer product comprises obtaining an outer product of the first vector and the second vector.

1.9 The method of embodiment 1.8, wherein the second vector is a zero-mean vector.

1.9.1 The method of embodiment 1.8, wherein the second vector is a non-zero-mean vector.

1.10 The method of any of embodiments 1.0 (A) to 1.9.1, wherein obtaining the first modulation kernel further comprises:

obtaining a second outer product, different from the first outer product, of the first vector and the second vector; and aggregating the outer products obtained.

Addition is made entry-wise.

For example, if first outer product (first "precursor kernel")=$Auu^T$; and a second outer product (second "precursor kernel")=$Buv^T$; then the corresponding embedding kernel is: X=$Auu^T+Buv^T$.

1.11 The method of embodiment 1.10, wherein obtaining the first modulation kernel further comprises:

obtaining a third outer product, different from the second outer product, of the first vector and the second vector; and aggregating the outer products obtained.

For example, if a first outer product=$Auu^T$; and a second outer product=$Buv^T$; and a third outer product=$Cvu^T$; then the corresponding embedding kernel is: X=$Auu^T+Buv^T+Cvu^T$.

1.12 The method of any of embodiments 1.0 (A) to 1.11, wherein obtaining the first modulation kernel further comprises:

obtaining a fourth outer product of the second vector and the second vector; and aggregating the outer products obtained.

For example, if a fourth outer product=$Dvv^T$; then the embedding kernel is: X=$Auu^T$+(optionally, $Buv^T$ and/or $Cvu^T$)+$Dvv^T$.

1.13 The method of any of embodiments 1.0 (A) to 1.12, wherein obtaining the first modulation kernel further comprises:

obtaining a fifth outer product of a third vector and a vector selected from the group consisting of the first vector and the second vector, wherein the third vector is orthogonal to the first vector; and aggregating the outer products obtained.

1.14 The method of embodiment 1.13, wherein the third vector is orthogonal to the second vector.

1.9.2 The method of embodiment 1.8, wherein at least one vector selected from the group consisting of the first vector, the second vector and the third vector are basis vectors for a DCT basis function.

1.0 (B) A method of steganographically encoding a watermark signal within an electronic host media signal representing an array of media elements, wherein each of the media elements is characterized by a media element value, the method comprising:

obtaining a first modulation kernel characterized by a set of modulation elements, wherein a modulation value is assigned to each modulation element such that the first modulation kernel represents an orthogonal matrix; and altering portions of the host media signal based on the first modulation kernel such that media element values for a first set of the media elements are modulated in accordance with modulation values assigned to corresponding modulation elements in the first modulation kernel.

1.1 The method of embodiment 1.0 (B), wherein obtaining the first modulation kernel comprises:
   obtaining an initial matrix; and
   computing a singular value decomposition (SVD) of the initial matrix, thereby obtaining a decomposed matrix.

1.2 The method of embodiment 1.1, wherein elements of the initial matrix is a random or pseudo-random matrix.

1.3 The method of any of embodiments 1.1 to 1.2, wherein elements of the initial matrix consist of non-zero values.

1.4 The method of embodiment 1.3, wherein obtaining the first modulation kernel further comprises, for each row of the decomposed matrix, dividing each element in the row by the first element in the row.

1.0 (C) A method of steganographically encoding a watermark signal within an electronic host media signal representing an array of media elements, wherein each of the media elements is characterized by a media element value, the method comprising:
obtaining a first modulation kernel characterized by a set of modulation elements, wherein a modulation value is assigned to each modulation element such that the first modulation kernel represents a square, zero-mean matrix, of order N, where N is 3 or greater; and
altering portions of the host media signal based on the first modulation kernel such that media element values for a first set of the media elements are modulated in accordance with modulation values assigned to corresponding modulation elements in the first modulation kernel.

A zero-mean matrix means a matrix having rows/columns with mean values of zero.

1.1 The method of any of embodiments 1.0 (A) or 1.0 (C), wherein the first modulation kernel represents a non-orthogonal matrix.

1.2 The method of any of embodiments 1.0 (A) or 1.0 (B), wherein the first modulation kernel represents a non-zero-mean matrix.

1.2.1 The method of embodiment 1.2 wherein the first modulation kernel represents a matrix having at least one zero-mean column.

1.2.2 The method of embodiment 1.2 wherein the first modulation kernel represents a matrix having a plurality of zero-mean columns.

First-Level Data Kernel—One Bit

2. The method of any of the previous embodiments, further comprising:
obtaining auxiliary data; and
encoding the auxiliary data into the host media signal by associating at least one first bit of the auxiliary data with the first modulation kernel.

2.1. The method of embodiment 2,
wherein the act of associating at least one first bit of the auxiliary data with the first modulation kernel comprises:
obtaining a data kernel characterized by a set of modulation elements, wherein modulation values are assigned to the modulation elements of the data kernel;
associating the at least one first bit of the auxiliary data with a first subset of the modulation elements; and
wherein the act of obtaining the first modulation kernel comprises setting the data kernel having the first subset of the modulation elements associated with the at least one first bit of the auxiliary data as the first modulation kernel.

2.2 The method of embodiment 2.1, wherein the data kernel consists of binary coefficients.

Binary coefficients are −1, 0 or 1. Alternatively, data kernel can include non-binary coefficients.

Second-Level Data Kernel—Multi-Bit

3. The method of any of embodiments 2 to 2.1, further comprising encoding the auxiliary data into the host media signal by associating at least one second bit of the auxiliary data with the first modulation kernel.

3.1. The method of embodiment 3,
wherein the act of associating at least one second bit of the auxiliary data with the first modulation kernel comprises associating the at least one second bit of the auxiliary data with a second subset of the modulation elements of the data kernel; and
wherein the act of obtaining the first modulation kernel comprises setting the data kernel having the first and second subsets, respectively associated with the at least one first bit of the auxiliary data and the at least one second bit of the auxiliary data, as the first modulation kernel.

3.2. The method of embodiment 3.1, wherein the first subset includes at least one modulation element that is also included in the second subset.

3.3. The method of any of embodiments 3.1 to 3.2, wherein the first subset includes at least one modulation element that is not included in the second subset.

3.4. The method of embodiment 3.3, wherein the first subset includes no modulation element that is included in the second subset.

3.5. The method of any of embodiments 3.1 to 3.4, wherein modulation values assigned to modulation elements of the first subset form a first data modulation pattern that is spatially orthogonal to a second data modulation pattern formed by modulation values assigned to modulation elements of the second subset.

3.7 The method of any of embodiments 2.1 to 3.5, wherein the data kernel represents a zero-mean matrix.

3.8 The method of any of embodiments 2.1 to 3.5, wherein the data kernel represents a non-zero-mean matrix.

3.8.1 The method of embodiment 3.8, wherein the data kernel represents a matrix having at least one zero-mean column.

3.8.2 The method of embodiment 3.8, wherein the data kernel represents a matrix having a plurality of zero-mean columns.

Third-Level Data Kernel—Diverse Data Kernels

4. The method of any of embodiments 1.0 to 3.8.2, further comprising:
obtaining a second modulation kernel characterized by a set of modulation elements, wherein each modulation element in the set is assigned a modulation value; and
altering portions of the host media signal based on the second modulation signal such that media element values for a second set of the media elements are modulated in accordance with modulation values assigned to corresponding modulation elements in the second modulation kernel.

As with the first modulation kernel, the second modulation kernel can represent a matrix corresponding to an outer product of a plurality of orthogonal vectors, an orthogonal matrix, a zero-mean matrix, or the like or any combination thereof.

5. The method of embodiment 4, wherein the second set of host media elements includes at least one media element that is not included in the first set of host media elements.

6. The method of embodiment 5, wherein the second set of host media elements includes no media element that is included in the first set of host media elements.

7. The method of any of embodiments 4 to 6, further comprising encoding the auxiliary data into the host media signal by associating at least one third bit of the auxiliary data with the second modulation kernel.

7.1 The method of embodiment 7, wherein the at least one first bit of the auxiliary data is not associated with the first bit of the auxiliary data.

7.2. The method of any of embodiments 7 to 7.1, wherein the act of associating at least one third bit of the auxiliary data with the second modulation kernel comprises associating the at least one third bit of the auxiliary data with a third subset of the modulation elements of the data kernel; and wherein the act of obtaining the second modulation kernel comprises setting the data kernel having the third subset associated with the at least one third bit of the auxiliary data as the second modulation kernel.

7.3. The method of embodiment 7.2, wherein modulation values assigned to modulation elements of the third subset form a third data modulation pattern that is spatially orthogonal to a first data modulation pattern formed by modulation values assigned to modulation elements of the first subset.

Sync Kernel

8. The method of any of embodiments 2.0 to 3.8.2, further comprising:

obtaining a synchronization kernel characterized by a set of modulation elements, wherein each modulation element in the set is assigned a modulation value such that the synchronization kernel facilitates subsequent discernment of a transformation to which encoded auxiliary data has been subjected; and aggregating the synchronization kernel and the data kernel, wherein the act of obtaining the first modulation kernel comprises setting the aggregated synchronization and data kernels as the first modulation kernel.

8.1. The method of embodiment 8, wherein aggregating the synchronization kernel the data kernel comprises adding the modulation values assigned to modulation elements of the synchronization kernel to modulation values assigned to corresponding modulation elements of the data kernel.

8.2. The method of any of embodiments 8 to 8.1, wherein the synchronization kernel is orthogonal to the data kernel.

8.2.0 The method of any of embodiments 8 to 8.1, wherein the synchronization kernel is non-orthogonal to the data kernel.

8.2.1 The method of embodiment 8.2, wherein modulation values assigned to modulation elements of the synchronization kernel form a synchronization modulation pattern that is spatially orthogonal to a modulation pattern formed by modulation values assigned to modulation elements of the data kernel.

8.3. The method of any of embodiments 8 to 8.2.1, wherein the synchronization kernel is orthogonal to the data kernel.

8.4 The method of any of embodiments 8 to 8.3 wherein the sync kernel consists of binary coefficients.

Binary coefficients are −1, 0 or 1. Alternatively, the data kernel can include non-binary coefficients.

8.5 The method of any of embodiments 8 to 8.4 wherein the sync kernel represents a zero-mean matrix.

8.6 The method of any of embodiments 8 to 8.5 wherein the sync kernel represents a non-zero-mean matrix.

8.6.1 The method of embodiment 8.3 wherein the sync kernel represents a matrix having at least one zero-mean column.

8.6.2 The method of embodiment 8.3 wherein the sync kernel represents a matrix having a plurality of zero-mean columns.

Additional Aspects of the Modulation Kernel

X.1 The method of any of embodiments 1.0 (A) or (B) or any embodiment from 2 to this embodiment, wherein the first modulation kernel represents a square matrix of order N, where N is greater than 2.

X.1.1. The method of any of embodiments of X.1, wherein the first modulation kernel represents a square matrix of order N, where N is less than 300.

X.1.2. The method of any of embodiments of X.1, wherein the first modulation kernel represents a square matrix of order N, where N is selected from the group consisting of 3, 4, 8, 16, 32, 64 and 128.

X.2 The method of any of embodiments X.1 to X.1.2, further comprising encoding associating a plurality of bits of the auxiliary data with the first modulation kernel such that the auxiliary data is associated with the first modulation kernel with an association efficiency of less than 1 bit per modulation element.

X.2.1 The method of embodiment X.2, wherein the association efficiency is equal to or greater than 0.75 bits per modulation element.

X.2.2 The method of embodiment X.2, wherein the association efficiency is equal to or less than $1-(1/N^2)$.

Additional Aspects of the Media Signal 1.1. The method of any of embodiments 1.0 to this embodiment, wherein the host media signal represents imagery.

1.2. The method of embodiment 1.1, wherein the imagery includes a still image.

1.3. The method of embodiment 1.1, wherein the imagery includes video.

1.4. The method of previous embodiments, wherein the host media signal represents a surface texture.

1.5. The method of embodiment 1.0 (any version of 1.0), wherein the host media signal represents three dimensional pattern of reflected radiation. See InfraStructs: http://www.karlddwillis.com/projects/infrastructs See also, K. Willis, A. Wilson, InfraStructs: Fabricating Information Inside Physical objects for imaging in the Terahertz Region, ACM Transactions on Graphics, Vol. 32, No. 4, Article 138, Publication Date: July 2013, which is hereby incorporated by reference.

1.6. The method of embodiment 1.0 (any version of 1.0), wherein the host media signal represents three dimensional pattern of reflected sound.

1.7. The method of any of the encoding embodiments, wherein the array of media elements comprises an array of pixels, such as a 2-D or 3-D array.

1.8. The method of any of the encoding embodiments, wherein the array of media elements comprises an array of voxels, such as a 2-D or 3-D array.

Additional Aspects of the Auxiliary Data 2.0 The method of any of the encoding embodiments, wherein at least two media elements in the first set of media elements are separated from one another by at least one media element in the array.

2.0.1 The method of any of the encoding embodiments, wherein at least two media elements in the first set of media elements adjoin one another.

2.1. The method of any of the encoding embodiments, wherein the auxiliary data is a single-bit data item.

2.2. The method of any of the encoding embodiments, wherein the auxiliary data is a multi-bit data item.

Additional Aspects of the "Altering" or "Modulating"

3.1. The method of any of the encoding embodiments, wherein the first set of media elements include a first set of pixels, and the media element values for the first set of media elements include luminance values.

3.2. The method of any of the encoding embodiments, wherein the first set of media elements include a first set of pixels, and the media element values for the first set of media elements include chrominance values.

Decoding Methods 1.0 (A) A method comprising:
  obtaining an electronic media signal representing an array of media elements;
  comparing media element values associated with the media elements of the obtained media signal;
  based on the comparing, generating a filtered media signal representing the array of media elements, wherein at least some of the media elements in the filtered media signal are characterized by filtered media element values; and
  determining a correlation between filtered media values for sets of the media elements in the filtered host media signal and modulation values assigned to corresponding modulation elements of a modulation kernel representing a matrix obtained by a process that includes obtaining a first outer product of a first vector and a vector selected from the group consisting of the first vector and a second vector orthogonal to the first vector.

1.0 (B) A method comprising:
  obtaining an electronic media signal representing an array of media elements;
  comparing media element values associated with the media elements of the obtained media signal;
  based on the comparing, generating a filtered media signal representing the array of media elements, wherein at least some of the media elements in the filtered media signal are characterized by filtered media element values; and
  determining a correlation between filtered media values for sets of the media elements in the filtered host media signal and modulation values assigned to corresponding modulation elements of a modulation kernel representing an orthogonal matrix.

1.0 (C) A method comprising:
  obtaining an electronic media signal representing an array of media elements;
  comparing media element values associated with the media elements of the obtained media signal;
  based on the comparing, generating a filtered media signal representing the array of media elements, wherein at least some of the media elements in the filtered media signal are characterized by filtered media element values; and
  determining a correlation between filtered media values for sets of the media elements in the filtered host media signal and modulation values assigned to corresponding modulation elements of a modulation kernel representing a square, zero-mean matrix, of order N, where N is 3 or greater.

2. The method of any of embodiments 1.0(A) to 1.0 (C), wherein the modulation kernel is the first modulation kernel as described in any of the previous encoding method embodiments.

3. The method of any of embodiments 1.0(A) to 1.0 (C), wherein the act of determining the correlation comprises estimating an orientation of the watermark signal within the obtained media signal.

3.0.1 The method of embodiment 3, wherein the orientation includes a rotation of the watermark signal within the obtained media signal.

3.0.2 The method of any of embodiments 3 to 3.0.1, wherein the orientation includes a scale of the watermark signal within the obtained media signal.

3.2 The method of embodiment 3, further comprising, by reference to the determined correlation, determining whether the obtained media signal includes a steganographically-encoded watermark signal.

4. The method of any of embodiments 3 to 3.2, wherein the watermark signal includes an auxiliary data component represented by a data kernel characterized by a set of modulation elements each assigned a modulation value,
wherein the act of determining the correlation comprises determining a correlation between filtered media values for the sets of media elements in the filtered host media signal and modulation values assigned to corresponding modulation elements of the data kernel.

5. The method of any of embodiments 3 to 3.2, wherein the watermark signal includes a synchronization component represented by a synchronization kernel characterized by a set of modulation elements each assigned a modulation value,
wherein the act of determining the correlation comprises determining a correlation between filtered media values for the sets of media elements in the filtered host media signal and modulation values assigned to corresponding modulation elements of the synchronization kernel.

5.1 The method of embodiment 5, wherein the synchronization kernel is orthogonal to the data kernel.

5.2 The method of embodiment 5, wherein the synchronization kernel is non-orthogonal to the data kernel.

6.1 The method of any of embodiments 4 to 5.2, wherein the watermark signal includes an auxiliary data component represented by a data kernel characterized by a set of modulation elements each assigned a modulation value, the method further comprising processing, by reference to the determined correlation and the data kernel, the filtered media signal to extract at least a portion of the auxiliary data component.

6.1.1 The method of embodiment 6.1, wherein the act of processing the filtered media signal comprises processing filtered media values for a first set of the media elements.

6.2 The method of embodiment 6.1.1, wherein the watermark signal includes a multi-bit auxiliary data component, and
wherein the act of processing the first set of filtered media signal comprises processing filtered media values for a first subset of media elements within the first set to extract a first bit of the multi-bit auxiliary data component.

6.2.1 The method of embodiment 6.2, wherein the act of processing the first set of filtered media signal values further comprises processing filtered media values for a second subset of media elements within the first set to extract a second bit of the multi-bit auxiliary data component.

6.2.1.1. The method of embodiment 6.2.1, wherein the first subset of media elements includes at least one media element that is also included in the second subset of media elements.

6.2.1.2. The method of any of embodiments 6.2.1 to 6.2.1.1, wherein the first subset of media elements includes at least one media element that is not included in the second subset of media elements.

6.2.1.3. The method of embodiment 6.2.1.2, wherein the first subset of media elements includes no media element that is included in the second subset of media elements.

6.3. The method of any of embodiments 6.1.1 to 6.2.1.3, wherein the act of processing the filtered media signal comprises processing filtered media values for a second set of the media elements.

6.3.1. The method of embodiment 6.3, wherein the first set of media elements includes at least one media element that is also included in the second set of media elements.

6.3.2. The method of any of embodiments 6.3 to 6.3.1, wherein the first set of media elements includes at least one media element that is not included in the second set of media elements.

6.3.3. The method of embodiment 6.3.2, wherein the first set of media elements includes no media element that is included in the second set of media elements.

6.4. The method of any of embodiments 6.3 to 6.3.3, wherein the act of processing filtered media values for the second set of the media elements comprises processing filtered media values for the second set of the media elements to extract the first bit of the multi-bit auxiliary data component.

6.4.1 The method of any of embodiments 6.3 to 6.3.3, wherein the act of processing filtered media values for the second set of the media elements comprises processing filtered media values for the second set of the media elements to extract a third bit of the multi-bit auxiliary data component.

Operating Environment

The components and operations of the encoder and decoder are implemented in modules. Notwithstanding any specific discussion of the embodiments set forth herein, the term "module" refers to software, firmware or circuitry configured to perform any of the methods, processes, functions or operations described herein. Software may be embodied as a software package, code, instructions, instruction sets or data recorded on non-transitory computer readable storage mediums. Software instructions for implementing the detailed functionality can be authored by artisans without undue experimentation from the descriptions provided herein, e.g., written in Matlab, C, C++, Visual Basic, Java, Python, Tcl, Perl, Scheme, Ruby, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hardwired circuitry, programmable circuitry such as computer processors comprising one or more individual instruction processing cores, state machine circuitry, or firmware that stores instructions executed by programmable circuitry.

Implementation can additionally, or alternatively, employ special purpose electronic circuitry that has been customdesigned and manufactured to perform some or all of the component acts, as an application specific integrated circuit (ASIC). To realize such an implementation, the relevant module(s) (e.g., encoding and decoding of differential modulation within host image or audio content) are first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Figure 28:
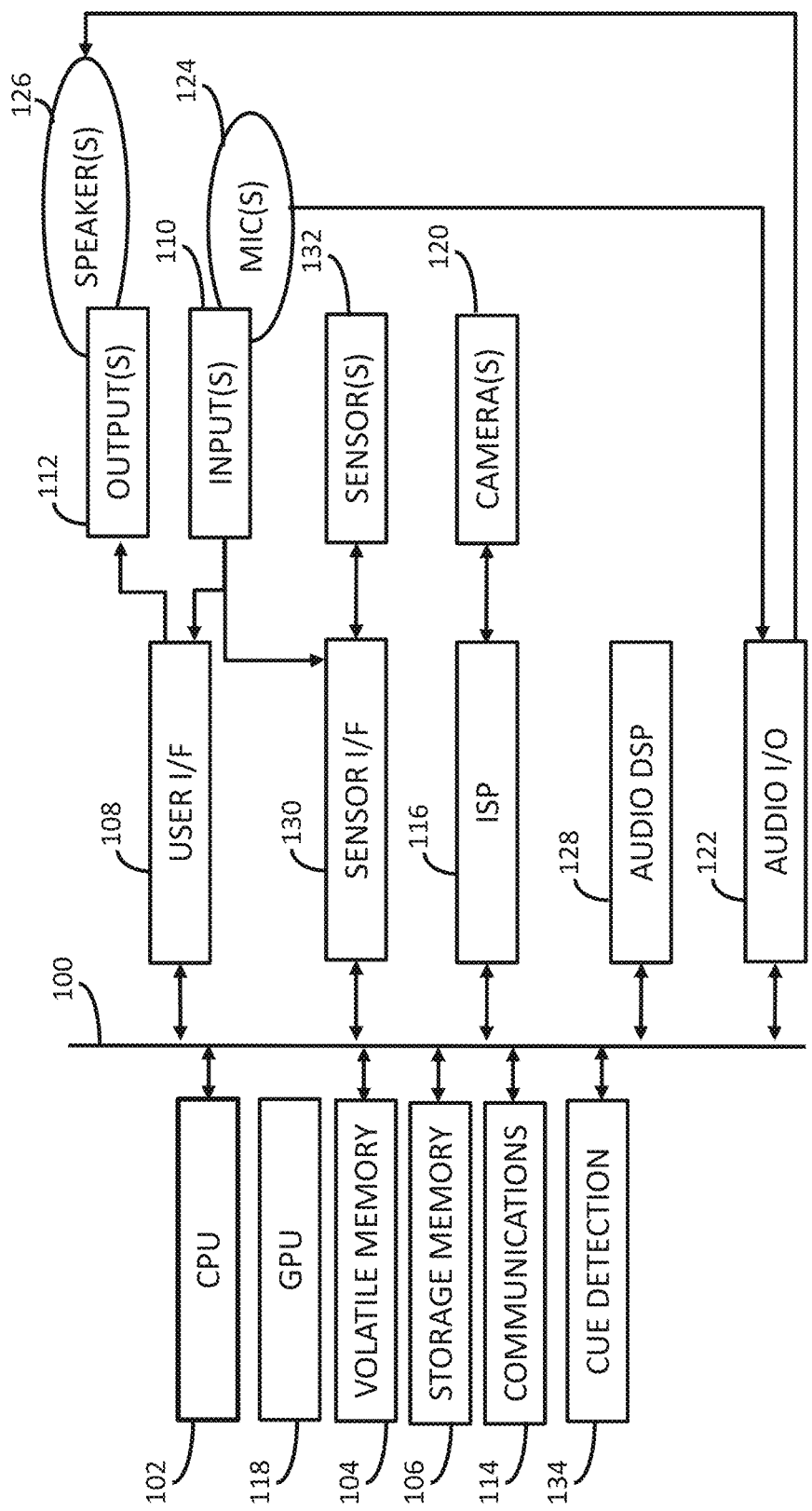
FIG. 28 illustrates an electronic device in which encoding and decoding may be implemented.

For the sake of illustration, FIG. 28 is a diagram of an electronic device in which the components of the above encoder and decoder embodiments may be implemented. It is not intended to be limiting, as the embodiments may be implemented in other device architectures or electronic circuitry.

Referring to FIG. 28, a system for an electronic device includes bus 100, to which many devices, modules, etc., (each of which may be generically referred as a "component") are communicatively coupled. The bus 100 may combine the functionality of a direct memory access (DMA) bus and a programmed input/output (PIO) bus. In other words, the bus 100 may facilitate both DMA transfers and direct CPU read and write instructions. In one embodiment, the bus 100 is one of the Advanced Microcontroller Bus Architecture (AMBA) compliant data buses. Although FIG. 28 illustrates an embodiment in which all components are communicatively coupled to the bus 100, it will be appreciated that one or more sub-sets of the components may be communicatively coupled to a separate bus in any suitable or beneficial manner, and that any component may be communicatively coupled to two or more buses in any suitable or beneficial manner. Although not illustrated, the electronic device can optionally include one or more bus controllers (e.g., a DMA controller, an I2C bus controller, or the like or any combination thereof), through which data can be routed between certain of the components.

The electronic device also includes a CPU 102. The CPU 102 may be any microprocessor, mobile application processor, etc., known in the art (e.g., a Reduced Instruction Set Computer (RISC) from ARM Limited, the Krait CPU product-family, any X86-based microprocessor available from the Intel Corporation including those in the Pentium, Xeon, Itanium, Celeron, Atom, Core i-series product families, etc.). The CPU 102 runs an operating system of the electronic device, runs application programs (e.g., mobile apps such as those available through application distribution platforms such as the Apple App Store, Google Play, etc.) and, optionally, manages the various functions of the electronic device. The CPU 102 may include or be coupled to a read-only memory (ROM) (not shown), which may hold an operating system (e.g., a "high-level" operating system, a "real-time" operating system, a mobile operating system, or the like or any combination thereof) or other device firmware that runs on the electronic device. The electronic device may also include a volatile memory 104 electrically coupled to bus 100. The volatile memory 104 may include, for example, any type of random access memory (RAM). Although not shown, the electronic device may further include a memory controller that controls the flow of data to and from the volatile memory 104. The electronic device may also include a storage memory 106 connected to the bus. The storage memory 106 typically includes one or more non-volatile semiconductor memory devices such as ROM, EPROM and EEPROM, NOR or NAND flash memory, or the like or any combination thereof, and may also include any kind of electronic storage device, such as, for example, magnetic or optical disks. In embodiments of the present invention, the storage memory 106 is used to store one or more items of software. Software can include system software, application software, middleware (e.g., Data Distribution Service (DDS) for Real Time Systems, MER, etc.), one or more computer files (e.g., one or more data files, configuration files, library files, archive files, etc.), one or more software components, or the like or any stack or other combination thereof. Examples of system software include operating systems (e.g., including one or more high-level operating systems, real-time operating systems, mobile operating systems, or the like or any combination thereof), one or more kernels, one or more device drivers, firmware, one or more utility programs (e.g., that help to analyze, configure, optimize, maintain, etc., one or more components of the electronic device), and the like. Application software typically includes any application program that helps users solve problems, perform tasks, render media content, retrieve (or access, present, traverse, query, create, organize, etc.) information or information resources on a network (e.g., the World Wide Web), a web server, a file system, a database, etc. Examples of software components include device drivers, software CODECs, message queues or mailboxes, databases, etc. A software component can also include any other data or parameter to be provided to application software, a web application, or the like or any combination thereof. Examples of data files include image files, text files, audio files, video files, haptic signature files, and the like.

Also connected to the bus 100 is a user interface module 108. The user interface module 108 is configured to facilitate user control of the electronic device. Thus the user interface module 108 may be communicatively coupled to one or more user input devices 110. A user input device 110 can, for example, include a button, knob, touch screen, trackball, mouse, microphone (e.g., an electret microphone, a MEMS microphone, or the like or any combination thereof), an IR or ultrasound-emitting stylus, an ultrasound emitter (e.g., to detect user gestures, etc.), one or more structured light emitters (e.g., to project structured IR light to detect user gestures, etc.), one or more ultrasonic transducers, or the like or any combination thereof.

The user interface module 108 may also be configured to indicate, to the user, the effect of the user's control of the electronic device, or any other information related to an operation being performed by the electronic device or function otherwise supported by the electronic device. Thus the user interface module 108 may also be communicatively coupled to one or more user output devices 112. A user output device 112 can, for example, include a display (e.g., a liquid crystal display (LCD), a light emitting diode (LED) display, an active-matrix organic light-emitting diode (AMOLED) display, an e-ink display, etc.), a light, a buzzer, a haptic actuator, a loud speaker, or the like or any combination thereof.

Generally, the user input devices 110 and user output devices 112 are an integral part of the electronic device; however, in alternate embodiments, any user input device 110 (e.g., a microphone, etc.) or user output device 112 (e.g., a loud speaker, haptic actuator, light, display, or printer) may be a physically separate device that is communicatively coupled to the electronic device (e.g., via a communications module 114). A printer encompasses many different devices for applying our encoded signals to objects, such as 2D and 3D printers, etching, engraving, embossing, laser marking, etc.

Although the user interface module 108 is illustrated as an individual component, it will be appreciated that the user interface module 108 (or portions thereof) may be functionally integrated into one or more other components of the electronic device (e.g., the CPU 102, the sensor interface module 130, etc.).

Also connected to the bus 100 is an image signal processor 116 and a graphics processing unit (GPU) 118. The image signal processor (ISP) 116 is configured to process imagery (including still-frame imagery, video imagery, or the like or any combination thereof) captured by one or more cameras 120, or by any other image sensors, thereby generating image data. General functions typically performed by the ISP 116 can include Bayer transformation, demosaicing, noise reduction, image sharpening, or the like or any combination thereof. The GPU 118 can be configured to process the image data generated by the ISP 116, thereby generating processed image data. General functions typically performed by the GPU 118 include compressing image data (e.g., into a JPEG format, an MPEG format, or the like or any combination thereof), creating lighting effects, rendering 3D graphics, texture mapping, calculating geometric transformations (e.g., rotation, translation, etc.) into different coordinate systems, etc. and send the compressed video data to other components of the electronic device (e.g., the volatile memory 104) via bus 100. The GPU 118 may also be configured to perform one or more video decompression or decoding processes. Image data generated by the ISP 116 or processed image data generated by the GPU 118 may be accessed by the user interface module 108, where it is converted into one or more suitable signals that may be sent to a user output device 112 such as a display, printer or speaker.

Also coupled the bus 100 is an audio I/O module 122, which is configured to encode, decode and route data to and from one or more microphone(s) 124 (any of which may be considered a user input device 110) and loud speaker(s) 126 (any of which may be considered a user output device 110). For example, sound can be present within an ambient, aural environment (e.g., as one or more propagating sound waves) surrounding the electronic device. A sample of such ambient sound can be obtained by sensing the propagating sound wave(s) using one or more microphones 124, and the microphone(s) 124 then convert the sensed sound into one or more corresponding analog audio signals (typically, electrical signals), thereby capturing the sensed sound. The signal(s) generated by the microphone(s) 124 can then be processed by the audio I/O module 122 (e.g., to convert the analog audio signals into digital audio signals) and thereafter output the resultant digital audio signals (e.g., to an audio digital signal processor (DSP) such as audio DSP 128, to another module such as a song recognition module, a speech recognition module, a voice recognition module, etc., to the volatile memory 104, the storage memory 106, or the like or any combination thereof). The audio I/O module 122 can also receive digital audio signals from the audio DSP 128, convert each received digital audio signal into one or more corresponding analog audio signals and send the analog audio signals to one or more loudspeakers 126. In one embodiment, the audio I/O module 122 includes two communication channels (e.g., so that the audio I/O module 122 can transmit generated audio data and receive audio data simultaneously).

The audio DSP 128 performs various processing of digital audio signals generated by the audio I/O module 122, such as compression, decompression, equalization, mixing of audio from different sources, etc., and thereafter output the processed digital audio signals (e.g., to the audio I/O module 122, to another module such as a song recognition module, a speech recognition module, a voice recognition module, etc., to the volatile memory 104, the storage memory 106, or the like or any combination thereof). Generally, the audio DSP 128 may include one or more microprocessors, digital signal processors or other microcontrollers, programmable logic devices, or the like or any combination thereof. The audio DSP 128 may also optionally include cache or other local memory device (e.g., volatile memory, non-volatile memory or a combination thereof), DMA channels, one or more input buffers, one or more output buffers, and any other component facilitating the functions it supports (e.g., as described below). In one embodiment, the audio DSP 128 includes a core processor (e.g., an ARM® AudioDE™ processor, a Hexagon processor (e.g., QDSP6V5A)), as well as a data memory, program memory, DMA channels, one or more input buffers, one or more output buffers, etc. Although the audio I/O module 122 and the audio DSP 128 are illustrated as separate components, it will be appreciated that the audio I/O module 122 and the audio DSP 128 can be functionally integrated together. Further, it will be appreciated that the audio DSP 128 and other components such as the user interface module 108 may be (at least partially) functionally integrated together.

The aforementioned communications module 114 includes circuitry, antennas, sensors, and any other suitable or desired technology that facilitates transmitting or receiving data (e.g., within a network) through one or more wired links (e.g., via Ethernet, USB, FireWire, etc.), or one or more wireless links (e.g., configured according to any standard or otherwise desired or suitable wireless protocols or techniques such as Bluetooth, Bluetooth Low Energy, WiFi, WiMAX, GSM, CDMA, EDGE, cellular 3G or LTE, Li-Fi (e.g., for IR— or visible-light communication), sonic or ultrasonic communication, etc.), or the like or any combination thereof. In one embodiment, the communications module 114 may include one or more microprocessors, digital signal processors or other microcontrollers, programmable logic devices, or the like or any combination thereof. Optionally, the communications module 114 includes cache or other local memory device (e.g., volatile memory, non-volatile memory or a combination thereof), DMA channels, one or more input buffers, one or more output buffers, or the like or any combination thereof. In one embodiment, the communications module 114 includes a baseband processor (e.g., that performs signal processing and implements real-time radio transmission operations for the electronic device).

Also connected to the bus 100 is a sensor interface module 130 communicatively coupled to one or more sensors 132. A sensor 132 can, for example, include an accelerometer (e.g., for sensing acceleration, orientation, vibration, etc.), a magnetometer (e.g., for sensing the direction of a magnetic field), a gyroscope (e.g., for tracking rotation or twist), a barometer (e.g., for sensing altitude), a moisture sensor, an ambient light sensor, an IR or UV sensor or other photodetector, a pressure sensor, a temperature sensor, an acoustic vector sensor (e.g., for sensing particle velocity), a galvanic skin response (GSR) sensor, an ultrasonic sensor, a location sensor (e.g., a GPS receiver module, etc.), a gas or other chemical sensor, or the like or any combination thereof. Although separately illustrated in FIG. 28, any camera 120 or microphone 124 can also be considered a sensor 132. Generally, a sensor 132 generates one or more signals (typically, electrical signals) in the presence of some sort of stimulus (e.g., light, sound, moisture, gravitational field, magnetic field, electric field, etc.), in response to a change in applied stimulus, or the like or any combination thereof. In one embodiment, all sensors 132 coupled to the sensor interface module 130 are an integral part of the electronic device; however, in alternate embodiments, one or more of the sensors may be physically separate devices communicatively coupled to the electronic device (e.g., via the communications module 114). To the extent that any sensor 132 can function to sense user input, then such sensor 132 can also be considered a user input device 110. The sensor interface module 130 is configured to activate, deactivate or otherwise control an operation (e.g., sampling rate, sampling range, etc.) of one or more sensors 132 (e.g., in accordance with instructions stored internally, or externally in volatile memory 104 or storage memory 106, ROM, etc., in accordance with commands issued by one or more components such as the CPU 102, the user interface module 108, the audio DSP 128, the cue detection module 134, or the like or any combination thereof). In one embodiment, sensor interface module 130 can encode, decode, sample, filter or otherwise process signals generated by one or more of the sensors 132. In one example, the sensor interface module 130 can integrate signals generated by multiple sensors 132 and optionally process the integrated signal(s). Signals can be routed from the sensor interface module 130 to one or more of the aforementioned components of the electronic device (e.g., via the bus 100). In another embodiment, however, any signal generated by a sensor 132 can be routed (e.g., to the CPU 102), the before being processed.

Generally, the sensor interface module 130 may include one or more microprocessors, digital signal processors or other microcontrollers, programmable logic devices, or the like or any combination thereof. The sensor interface module 130 may also optionally include cache or other local memory device (e.g., volatile memory, non-volatile memory or a combination thereof), DMA channels, one or more input buffers, one or more output buffers, and any other component facilitating the functions it supports (e.g., as described above). In one embodiment, the sensor interface module 130 may be provided as the "Sensor Core" (Sensors Processor Subsystem (SPS)) from Qualcomm, the "frizz" from Megachips, or the like or any combination thereof. Although the sensor interface module 130 is illustrated as an individual component, it will be appreciated that the sensor interface module 130 (or portions thereof) may be functionally integrated into one or more other components (e.g., the CPU 102, the communications module 114, the audio I/O module 122, the audio DSP 128, the cue detection module 134, or the like or any combination thereof).

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the signal processing operations described above may be implemented as instructions stored in a non-transitory memory and executed in a programmable computer (including both software and firmware instructions), implemented as digital logic circuitry in a special purpose digital circuit, or combination of instructions executed in one or more processors and digital logic circuit modules. The methods and processes described above may be implemented in programs executed from a system's memory (a computer readable medium, such as an electronic, optical or magnetic storage device). The methods, instructions and circuitry operate on electronic signals, or signals in other electromagnetic forms. These signals further represent physical signals like image signals captured in image sensors, audio captured in audio sensors, as well as other physical signal types captured in sensors for that type. These electromagnetic signal representations are transformed to different states as detailed above to detect signal attributes, perform pattern recognition and matching, encode and decode digital data signals, calculate relative attributes of source signals from different sources, etc.

The above methods, instructions, and hardware operate on reference and suspect signal components. As signals can be represented as a sum of signal components formed by projecting the signal onto basis functions, the above methods generally apply to a variety of signal types. The Fourier transform, for example, represents a signal as a sum of the signal's projections onto a set of basis functions. Other examples of signal projections or transforms include Wavelet transforms and subband transforms. Still other examples are provided above, such as DCT, PCA, SVD, and KLT.

The particular combinations of elements and features in the above-detailed embodiments are exemplary only; the interchanging and substitution of these teachings with other teachings in this and the incorporated-by-reference patents/applications are also contemplated.

We claim:

1. A non-transitory computer readable medium on which is stored instructions, which when executed by a processor, perform the method of:
generating an auxiliary data signal comprised of variable data elements;
mapping each of the variable data elements to plural blocks within a host image signal, wherein each block comprises neighboring embedding locations within the host image signal;
for each variable data element, modulating the host image signal according to the variable data element to embed the variable data element in corresponding plural blocks, including within each of the corresponding plural blocks, modulating the host image signal by establishing differential relationships between the variable data element in non-adjacent embedding locations within each block of the plural blocks.

2. The non-transitory computer readable medium of claim 1 on which is stored instructions, which when executed by a processor, perform the method of:
mapping variable data elements in a repetitive structure that forms a template in a frequency domain transform of the host image signal.

3. The non-transitory computer readable medium of claim 1 wherein plural of the variable data elements are mapped to the same plural blocks within the host image signal, and plural variable data elements within the same block are encoded in differential relationships among interleaved embedding locations within the same block.

4. The non-transitory computer readable medium of claim 1 on which is stored instructions, which when executed by a processor, perform the method of:
mapping synchronization signal elements to plural blocks within the host image signal.

5. The non-transitory computer readable medium of claim 4 wherein embedding locations of the synchronization signal elements and the variable data elements are interleaved within the same plural blocks.

6. The non-transitory computer readable medium of claim 4 wherein differential relationships for encoding the variable data elements and synchronization signal elements are established using vectors for the variable data elements and synchronization elements that are orthogonal.

7. An apparatus for encoding auxiliary data in a host image signal, the apparatus comprising:
means for generating an auxiliary data signal comprised of variable data elements;
means for mapping each of the variable data elements to plural blocks within the host image signal, wherein each block comprises neighboring embedding locations within the host image signal;
means for modulating the host image signal according to the variable data element to embed the variable data element in corresponding plural blocks, including means for modulating the host image signal by establishing differential relationships between the variable data element in non-adjacent embedding locations within corresponding blocks where each variable data element is mapped.

8. The non-transitory computer readable medium of claim 1, further comprising instructions, which when executed by a processor, perform a method of decoding an auxiliary data signal embedded in a host image, the method comprising:
applying geometrically distorted versions of a first extraction filter to the host image to obtain feature vectors;
obtaining geometric distortion parameters from the feature vectors;
for each of plural filtering locations within the host image, applying a second extraction filter that extracts auxiliary data signal elements from relationships between host image signal elements at embedding locations within a block of neighboring embedding locations around a filtering location, wherein the relationships are formed by differential modulation of the auxiliary data signal within the host image;
aggregating filter output across plural filtering locations for each of plural variable data signal elements within the auxiliary data signal to obtain estimates of each of the plural variable data signal elements; and
error correction decoding a variable message from the estimates.

9. The non-transitory computer readable medium of claim 8, further comprising instructions, which when executed by a processor, perform the acts of:
transforming the host image into a frequency domain, wherein a repetitive pattern of the relationships form a template;
matching the transformed host image with a pre-determined template to obtain an estimate of rotation and scale of the auxiliary data signal within the host image.

10. The non-transitory computer readable medium of claim 9, further comprising instructions, which when executed by a processor, perform the acts of:
with the rotation and scale to compensate for geometric distortion, applying the extraction filter to extract an approximate auxiliary data signal from the relationships;
transforming the approximate auxiliary data signal into a frequency domain; and
refining synchronization by matching the pre-determined template with the transformed approximate auxiliary data signal.

11. The non-transitory computer readable medium of claim 8 further comprising instructions, which when executed by a processor, perform the act of:
transforming the host image into a frequency domain, wherein a repetitive pattern of the relationships form a template; wherein the auxiliary data signal comprises variable data signal elements and sync signal elements that are differentially encoded within the host image according to orthogonal vectors for the variable data signal elements and the sync signal elements.

12. The non-transitory computer readable medium of claim 8 further comprising instructions, which when executed by a processor, perform the act of:
synchronizing the auxiliary data signal with nulls formed in an output of applying the second extraction filter to the host image.

\* \* \* \* \*